US011651697B2

(12) United States Patent
Ayhan et al.

(10) Patent No.: US 11,651,697 B2
(45) Date of Patent: May 16, 2023

(54) SYSTEMS, METHODS, AND APPARATUS TO IMPROVE AIRCRAFT TRAFFIC CONTROL

(71) Applicant: The Boeing Company, Chicago, IL (US)

(72) Inventors: Samet Ayhan, Chantilly, VA (US); Glaucia Costa Balvedi, São José dos Campos (BR); Pablo Costas Alvarez, Madrid (ES); Ian Andrew Byham Wilson, Chantilly, VA (US); Alexandre C. Leite, Campos dos Goytacazes (BR); Italo Romani De Oliveira, São José dos Campos (BR)

(73) Assignee: THE BOEING COMPANY, Arlington, VA (US)

( * ) Notice: Subject to any disclaimer, the term of this patent is extended or adjusted under 35 U.S.C. 154(b) by 70 days.

(21) Appl. No.: 17/212,664

(22) Filed: Mar. 25, 2021

(65) Prior Publication Data

US 2021/0312819 A1   Oct. 7, 2021

(30) Foreign Application Priority Data

Apr. 7, 2020   (EP) .................................. 20382282

(51) Int. Cl.
*G08G 5/00*   (2006.01)
*G05D 1/10*   (2006.01)

(52) U.S. Cl.
CPC .......... *G08G 5/0039* (2013.01); *G05D 1/101* (2013.01); *G08G 5/0034* (2013.01); *G08G 5/0047* (2013.01)

(58) Field of Classification Search
CPC .. G08G 5/0039; G08G 5/0034; G08G 5/0047; G08G 5/0043; G08G 5/0026;

(Continued)

(56) References Cited

U.S. PATENT DOCUMENTS 7,212,917 B2   5/2007  Wilson, Jr.
9,691,286 B2   6/2017  Bahrami et al.
(Continued)

FOREIGN PATENT DOCUMENTS

CN   104952123 A  *  9/2015
CN   206991559 U     2/2018
(Continued)

OTHER PUBLICATIONS

English translation of CN-104952123-A (Year: 2015).*
(Continued)

*Primary Examiner* — Shon G Foley
(74) *Attorney, Agent, or Firm* — Hanley, Flight & Zimmerman, LLC

(57) ABSTRACT

Methods, apparatus, systems and articles of manufacture are disclosed to improve aircraft traffic control. An example apparatus includes a network interface to obtain air route traffic (ART) data associated with aircraft flying in airspace sectors during a first time period, a database controller to generate a first database entry by mapping extracted portions of the ART data to a first database entry field of the first database entry, and ART sector services to execute machine learning (ML) models using database entries to generate first aircraft traffic counts of the airspace sectors during the first time period, in response to selecting a first ML model of the ML models based on the first aircraft traffic counts, execute the first ML model to generate second aircraft traffic counts during a second time period, and transmit the second aircraft traffic counts to a computing device to cause an aircraft flight plan adjustment.

20 Claims, 19 Drawing Sheets

(58) Field of Classification Search
CPC .... G08G 5/003; G05D 1/101; G06F 16/2462; G06F 16/2474; G06F 16/29; G06N 20/00; G06Q 50/30
See application file for complete search history.

(56) References Cited

U.S. PATENT DOCUMENTS

| | | |
|---|---|---|
| 10,074,283 B1 | 9/2018 | de Oliveira et al. |
| 10,223,921 B2 | 3/2019 | Navarro Felix et al. |
| 2018/0366008 A1 | 12/2018 | Dacre-Wright et al. |
| 2021/0094435 A1* | 4/2021 | Rechkemmer .......... B60L 53/66 |

FOREIGN PATENT DOCUMENTS

| | | |
|---|---|---|
| CN | 109448366 A | 3/2019 |
| CN | 109637196 A | 4/2019 |
| CN | 109740818 A | 5/2019 |
| CN | 110633875 A | 12/2019 |
| EP | 3104119 A1 | 12/2016 |

OTHER PUBLICATIONS

European Patent Office, "Extended European Search Report", issued in connection with European Patent Application No. 20382282.0, dated Sep. 28, 2020, (9 pages).

* cited by examiner

| Key | Value | Type |
|---|---|---|
| ∨ [{}] (1) { _id : ZNYNC1} | { 9 fields } | Document |
| _id | ZNYNC1 | String |
| > [ ] art:departureTimelist | [ 2770 elements ] | Array |
| > [ ] art:flightInList | [ 2770 elements ] | Array |
| 1.23 art:dailyCount | 2770 | Int32 |
| art:msgType | sectorCount | String |
| :32 art:version | 3 | Int32 |
| > [ ] art:timeBuckets | [ 1440 elements ] | Array |

"getOneSectorCount": "Gets sector count for one sector, several days",
"getAllSectorCountDaily": "Gets sector count for all sectors, just one day",
"getOneSectorCountInfo": "Gets sector count for one sector, several days, with info",
"getOneSectorCountGrouped": "Gets sector count for one sector, several days, with flights grouped",
"getOneSectorCountMatch": "Gets sector count for one sector, several days, with specific flights",
"getMeanPastSectorCountAllDays": "Gets mean sector count for one sector for past continuous days",
"getMeanPastSectorCountWeekDays": "Gets mean sector count for one sector for past same week days",
"getOneDailySectorCount": "Gets daily sector count for one sector, several days",
"getMeanPastDailySectorCountAllDays": "Gets mean daily sector count for one sector, past continuous days",
"getMeanPastDailySectorCountWeekDays": "Gets mean daily sector count for one sector, past same week days",
"getAllDailySectorCount": "Gets daily sector count for all sectors, several days",
"getOneSectorCountWeekDays": "Gets sector count for one sector, several days, same day of week",
"getAllSectorCountWeekDays": "Gets sector count for all sectors, several days, same day of week",
"getOneSectorCountAllWeekDays": "Gets sector count for one sector, several days, for all days of week separately",
"predictSectorCountOneDay": "Predicts sector count for one or more sectors, one day of week",
"predictSectorCountOneDay": "Predicts sector count for one or more sectors, one day",
"predictSumSectorCountOneDay": "Returns the sum of predicted sector count for several sectors, one day",
"predictSectorCountAllWeekDays": "Predicts sector count for one or more sectors, all days of week",
"predictAllSectorCountOneDay": "Predicts sector count for all sectors, one day"

SYSTEMS, METHODS, AND APPARATUS TO IMPROVE AIRCRAFT TRAFFIC CONTROL

RELATED APPLICATION

This patent arises from an application claiming the benefit of European Patent Application No. EP20382282, which was filed on Apr. 7, 2020. European Patent Application No. EP20382282 is hereby incorporated herein by reference in its entirety. Priority to European Patent Application No. EP20382282 is hereby claimed.

FIELD OF THE DISCLOSURE

This disclosure relates generally to aircraft and, more particularly, to systems, methods, and apparatus to improve aircraft traffic control.

BACKGROUND

The National Airspace System (NAS) manages the airspace, navigation facilities, and airports of the United States while different airspace systems manage other regions of the world. In recent years, civil aviation has experienced considerable growth, especially within the NAS, and a continuously increasing trend of growth is expected for future years. However, the NAS is unable to efficiently manage the increased aircraft traffic causing an increase in expected delayed flights, which results in costs to airlines, passengers, and other relevant stakeholders.

BRIEF DESCRIPTION OF THE DRAWINGS

FIG. 5 is an example database entry generated by the database controller of FIGS. 2 and/or 3.

FIG. 10 depicts example source code representative of example computer readable instructions that may be executed by the ART sector services of FIGS. 2 and/or 4, and/or more generally, the ART prediction system of FIGS. 1 and/or 2, to determine a traffic count for an air route traffic sector of interest.

The figures are not to scale. In general, the same reference numbers will be used throughout the drawing(s) and accompanying written description to refer to the same or like parts.

SUMMARY

Figure 1:
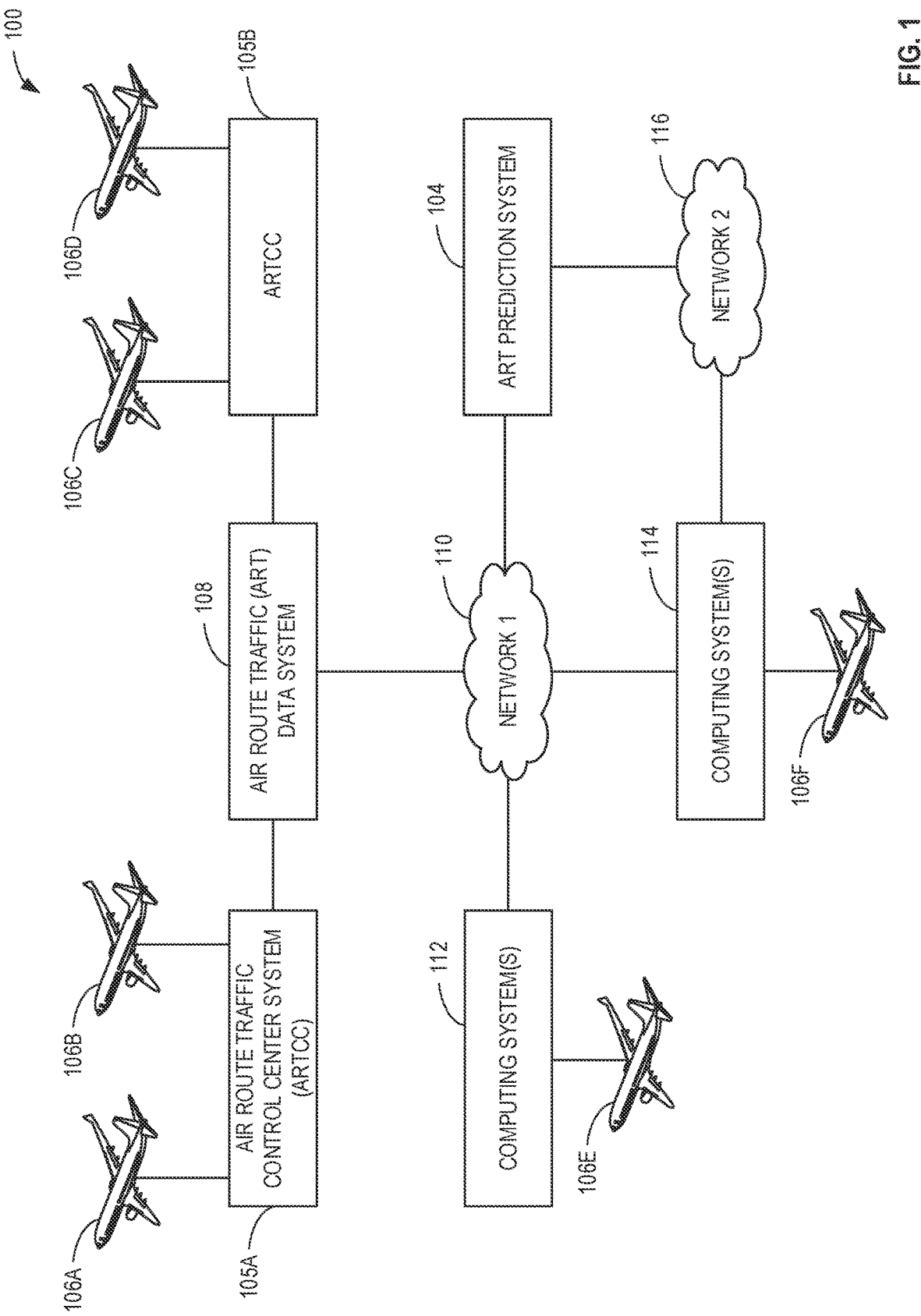
FIG. 1 depicts an example implementation of an air route traffic (ART) environment including an ART prediction system to facilitate air route traffic management.

An example apparatus to improve aircraft traffic control is disclosed herein. The example apparatus includes a network interface to obtain air route traffic data associated with a plurality of aircraft flying in airspace sectors, the air route traffic data associated with a first time period, a database controller to generate a first database entry by mapping one or more extracted portions of the air route traffic data to a first database entry field included in the first database entry, the first database entry field associated with a respective one of the plurality of the aircraft, and air route traffic (ART) sector services to execute a plurality of machine learning models using database entries to generate first aircraft traffic counts of the airspace sectors during the first time period, the database entries including the first database entry, in response to selecting a first machine learning model of the plurality of the machine learning models based on the first aircraft traffic counts, execute the first machine learning model to generate second aircraft traffic counts of the airspace sectors during a second time period after the first time period, and transmit the second aircraft traffic counts to a computing device to cause an adjustment of a flight plan of a first aircraft of the plurality of the aircraft.

An example non-transitory computer readable storage medium to improve aircraft traffic control is disclosed herein. The example non-transitory computer readable storage medium comprises instructions that, when executed, cause a machine to at least obtain air route traffic data associated with a plurality of aircraft flying in airspace sectors, the air route traffic data associated with a first time period, generate a first database entry having a first database entry field associated with a respective one of the plurality of the aircraft by mapping one or more extracted portions of the air route traffic data to the first database entry field, execute a plurality of machine learning models using database entries to generate first aircraft traffic counts of the airspace sectors during the first time period, the database entries including the first database entry, in response to selecting a first machine learning model of the plurality of the machine learning models based on the first aircraft traffic counts, execute the first machine learning model to generate second aircraft traffic counts of the airspace sectors during a second time period after the first time period, and transmit the second aircraft traffic counts to a computing device to cause an adjustment of a flight plan of a first aircraft of the plurality of the aircraft.

An example method to improve aircraft traffic control is disclosed herein. The example method includes obtaining air route traffic data associated with a plurality of aircraft flying in airspace sectors, the air route traffic data associated with a first time period, generating a first database entry by mapping one or more extracted portions of the air route traffic data to a first database entry field included in the first database entry, the first database entry field associated with a respective one of the plurality of the aircraft, executing a plurality of machine learning models using database entries to generate first aircraft traffic counts of the airspace sectors during the first time period, the database entries including the first database entry, in response to selecting a first machine learning model of the plurality of the machine learning models based on the first aircraft traffic counts, executing the first machine learning model to generate second aircraft traffic counts of the airspace sectors during a second time period after the first time period, and transmitting the second aircraft traffic counts to a computing device to cause an adjustment of a flight plan of a first aircraft of the plurality of the aircraft.

DETAILED DESCRIPTION

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

In air traffic control (e.g., aircraft traffic control, airspace traffic control, etc.), an area control center (ACC), also known as an en-route center, is a facility responsible for controlling aircraft flying in a particular volume of airspace (e.g., a flight information region) at high altitudes between airport arrivals and departures. The International Civil Aviation Organization (ICAO) governs general operations of ACCs worldwide, and the boundaries of the airspace each ACC controls. Most ACCs are operated by the national governments of the countries in which they are located. The National Airspace System (NAS) manages such ACCs in the United States. The ACCs in the United States are referred to as air route traffic control centers (ARTCCs). Today, the NAS manages the airspace, navigation facilities, and airports of the United States, in part, by managing 22 ARTCCs. For example, an ARTCC of the NAS typically accepts traffic from, and ultimately passes traffic to, the control of a terminal control center or another ARTCC.

Airspace controlled, managed, etc., by the NAS is subdivided into areas or sectors (e.g., air route traffic sectors, airspace sectors, etc.). ARTCCs may manage multiple sectors. For example, an ARTCC may manage a flight information region including two to nine sectors. Each ARTCC is staffed by a set of controllers (e.g., air traffic controllers) trained on all sectors in that flight information region. Controllers use radar to monitor the progress of flights and instruct aircraft to perform course adjustments (e.g., flight path or flight plan adjustments) as needed to maintain separation from other aircraft. Pilots may accept or reject altitude adjustments or course changes for reasons including avoidance of turbulence or adverse weather conditions. Typically, ARTCCs have advance notice of an aircraft's arrival and intentions from its pre-filed flight plan or flight path.

As the NAS air traffic control model demands substantial involvement of pilots and controllers alike, the considerable growth in civil aviation in recent years has exposed inefficiencies of the model. The substantial increase in the quantity of aircraft to manually track by controllers and the corresponding frequency of aircraft entering and leaving a flight information area can lead to frequent flight delays, which may be compounded by adverse weather conditions. Accordingly, the expected trend of growth for upcoming years will only amplify such inefficiencies. Such inefficiencies cause increases in delayed flights, which result in costs to airlines, passengers, and other relevant stakeholders.

The NAS, which is managed by the Federal Aviation Administration (FAA), coordinates and/or otherwise manages air route traffic (ART) with a Traffic Flow Management (TFM) Data Service that aggregates ART data from ARTCCs stationed around the United States. The TFM Data Service provides near real-time streaming flight and flow data to users (e.g., airlines, Air Navigation Service Providers (ANSPs), etc.) of the TFM Data Service. However, the incoming data to the users is (1) uncorrelated and noisy, (2) substantial in quantity, and (3) generated at high frequency, all of which can prevent the efficient determination of aircraft traffic control decisions by human personnel.

The TFM Data Service collects and/or otherwise obtains ART data associated with flight information regions. ART data can include Flight Information Exchange Model (FIXM) data or messages (e.g., FIXM data, FIXM messages, FIXM data messages, data messages, etc.). FIXM is a data exchange model that captures flight and flow information that is globally standardized. FIXM messages are formatted using Extensible Markup Language (XML). FIXM messages can include ART data such as a flight number of an aircraft, a location of the aircraft (e.g., an altitude, a latitude, a longitude, a sector, etc.), a characteristic or parameter of the aircraft (e.g., an aircraft make or model, an air speed, etc.), a timestamp corresponding to generation of the ART data, etc., and/or a combination thereof. For example, an aircraft can obtain and/or otherwise aggregate data of interest associated with the aircraft, compile the data as a FIXM message, and transmit the FIXM message to an ARTCC to which the aircraft is in contact or communication with. Accordingly, ARTCCs obtain millions of FIXM messages daily and billions of FIXM messages annually, where the FIXM messages correspond to air route traffic within flight information regions managed by the NAS.

Examples disclosed herein include an ART prediction system to improve aircraft traffic control by accurately predicting counts or quantities of aircraft (e.g., predict with a substantially small standard deviation, predict with less than one standard deviation, etc.) for a particular airspace sector managed by an airspace system such as the NAS. The example ART prediction system can parse, correlate, and index incoming ART data from the TFM Data Service to be stored in a first database (e.g., a raw ART data database). The example ART prediction system can adaptively maintain the first database for efficient query processing. The example ART prediction system can extract and/or otherwise identify salient features from the ART data stored in the first database and store the salient features in a second database (e.g., a pre-processed database). The example ART prediction system can also identify other salient features such as historical trajectories, sector boundary crossings, and/or weather information.

In some disclosed examples, the ART prediction system enters features of interest into artificial intelligence (AI) based computer models to efficiently predict accurate counts (e.g., aircraft counts, sector counts, traffic counts, etc.) with a substantially small standard deviation, margin of error, etc. As used herein, the terms "sector count," "sector traffic count," and "traffic count" refer to a quantity of aircraft in an airspace sector during a discretized time interval (e.g., a bucket) and are used interchangeably. The example ART prediction system can select an AI-based computer model of a plurality of AI-based computer models for predicting future traffic counts of sectors.

In some disclosed examples, the ART prediction system can select the AI-based computer model by using cross-validation techniques. In some disclosed examples, the ART prediction system can select the AI-based computer model by executing the plurality of the AI-based computer models on ART data having known traffic counts and comparing traffic counts predicted by the AI-based computer models to the known traffic counts. For example, the ART prediction system can execute the plurality of the AI-based computer models on ART data associated with sectors in a first bucket (e.g., a 15-minute time interval, a 30 minute time interval, etc.) of interest. In such examples, the ART prediction system can predict first traffic counts for a first sector of interest during the first bucket. The example ART prediction system can compare the first traffic counts to a known traffic count associated with the first sector during the first bucket. The example ART prediction system can identify one of the AI-based computer models to train for prediction of future traffic counts based on which of the AI-based computer models generated traffic counts having the least error, generated traffic counts with the highest accuracy, etc.

In some disclosed examples, the ART prediction system trains and executes the identified AI-based computer model using previously collected and/or new incoming ART data to predict and/or otherwise generate a traffic count for sector(s) of interest. In some disclosed examples, the ART prediction system transmits the traffic count for the sector(s) of interest to computing system(s) (e.g., an ARTCC computing system, an airline computing system, etc.). In such disclosed examples, the ART prediction system can transmit instructions, recommendations, etc., to computing system(s) to adjust air route traffic for a sector of interest based on the traffic count for the sector of interest. For example, an ARTCC can direct an aircraft having a first flight plan (e.g., a first set of one or more waypoints) associated with flying through a first sector to adjust to a second fight plan (e.g., a second set of one or more waypoints) associated with flying through a second sector, where the first sector is a congested sector and the second sector is a non-congested or less-congested sector. In some disclosed examples, the first flight plan of the aircraft can be adjusted while the aircraft is parked on a ground surface prior to executing the first flight plan. In some disclosed examples, the first flight plan of the aircraft can be adjusted while the aircraft is in flight executing the first flight plan.

AI, including machine learning (ML), deep learning (DL), and/or other artificial machine-driven logic, enables machines (e.g., computers, computing systems, logic circuits, etc.) to use a model to process input data to generate an output based on patterns and/or associations previously learned by the model via a training process. For instance, the model can be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, linear regression, non-linear, and ensemble regression models are used in addition to neural networks such as a Recurrent Neural Network (RNN). Such regression models can implement a multi-layer perceptron (MLP). An MLP is a supervised learning algorithm that learns a function by training on a dataset that, when given a set of features and a target, the MLP can learn a non-linear function approximator for regression (and/or classification in other examples). The MLP can train using backpropagation with no activation function in the output layer, which can also be seen as using the identity function as activation function. Accordingly, MLP can use the square error as the loss function, and the output can be a set of continuous values.

RNNs correspond to a class of artificial neural networks where connections between nodes form a directed graph along a temporal sequence. Advantageously, the RNN can thus exhibit temporal dynamic behavior, which unlike feedforward neural networks, can use an internal state (memory) of the RNN to process sequences of inputs. In general, machine learning models/architectures that are suitable to use in the example approaches disclosed herein will be linear regression, non-linear regression, ensemble regression, RNNs, etc. However, other types of machine learning models could additionally or alternatively be used such as a Convolution Neural Network (CNN), a Deep Neural Network (DNN), a Graph Neural Network, etc.

In general, implementing an ML/AI system involves two phases, a learning/training phase and an inference phase. In the learning/training phase, a training algorithm is used to train a model to operate in accordance with patterns and/or associations based on, for example, training data (e.g., ART data). In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using supervised learning. However, any other training algorithm may additionally or alternatively be used. In examples disclosed herein, training is performed until an acceptable amount of error is achieved (e.g., one or less standard deviation of error) and/or whether additional ART data identified as ART learning data has not yet been processed. In examples disclosed herein, training is performed at a central facility representative of one or more physical and/or virtual servers. Training is performed using hyperparameters that control how the learning is performed (e.g., a learning rate, a number of layers to be used in the machine learning model, etc.). In some disclosed examples re-training can be performed in response to identifying additional ART learning data for training.

Training is performed using training data. In some examples, the training data includes sector information associated with one or more sectors managed by the NAS. For example, the sector information can include a quantity of aircraft including a first aircraft in a sector during a bucket (e.g., a time bucket) or time period, an entry time (e.g., a sector entry time) associated with the first aircraft representative of the first aircraft entering the sector, an exit time (e.g., a sector exit time) associated with the first aircraft representative of the first aircraft exiting the sector, etc., and/or a combination thereof. In examples disclosed herein, the training data originates from the FAA TFM Data Service and/or a different data service in connection with the FAA and/or ICAO. Because supervised training is used, the training data is labeled. Labeling is applied to the training data by computing system(s) that have determined traffic counts in connection with sector(s) of interest.

Once training is complete, the model is deployed for use as an executable construct that processes an input and provides an output based on the network of nodes and connections defined in the model. The model is stored at the central facility, which can be accessed by computing system(s) subscribed for access to the ART prediction system. The model can then be executed by the ART prediction system.

Once trained, the deployed model can be operated in an inference phase to process data (e.g., ART data). In the inference phase, data to be analyzed (e.g., live data or near-live data from the FAA TFM Data Service) is input to the model, and the model executes to create an output. This inference phase can be thought of as the AI "thinking" or processing to generate the output based on what the AI learned from the training (e.g., by executing the model to apply the learned patterns and/or associations to the live data). In some examples, input data undergoes pre-processing before being used as an input to the machine learning model. Moreover, in some examples, the output data can undergo post-processing after it is generated by the AI model to transform the output into a useful result (e.g., a display of data, an instruction to be executed by a machine, etc.).

In some examples, output of the deployed model can be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 depicts an example implementation of an air route traffic management environment 100 including an air route traffic (ART) prediction system 104 to facilitate ART management. For example, the ART management environment 100 can correspond to the NAS, the ICAO, etc. In such examples, the ART management environment can correspond to an aircraft traffic control environment, an aircraft traffic control system, etc.

In the illustrated example of FIG. 1, the ART management environment 100 includes example air route traffic control center (ARTCCs) 105A-B, including a first example ARTCC 105A and a second example ARTCC 105B. Alternatively, the ART management environment 100 may include fewer or more ARTCCs than the ARTCCs 105A-B depicted in FIG. 1. In FIG. 1, each of the ARTCCs 105A-B can correspond to and/or otherwise be representative of one or more processor platforms, such as a server (e.g., a computer server). For example, the first ARTCC 105A can correspond to and/or otherwise be implemented with one or more servers.

In the illustrated example of FIG. 1, the ARTCCs 105A-B are managed by the NAS. Alternatively, the ARTCCs 105A-B may be managed by a different entity such as the ICAO. In FIG. 1, the ARTCCs 105A-B manage flight information regions including multiple sectors (e.g., two sectors, nine sectors, etc.). For example, the first ARTCC 105A can manage a first flight information region including two sectors and the second ARTCC 105B can manage a second flight information region including nine sectors, where the first flight information region is different from the second flight information region. In other examples, the first ARTCC 105A and/or the second ARTCC 105B can manage a different number of sectors. Each of the ARTCCs 105A-B can be staffed by a set of controllers (e.g., air traffic controllers) trained on the sectors of a respective one of the flight information regions.

In the illustrated example of FIG. 1, the ARTCCs 105A-B receive and/or otherwise obtain ART data from one or more example aircraft 106A-F. The aircraft 106A-F of FIG. 1 include a first example aircraft 106A, a second example aircraft 106B, a third example aircraft 106C, a fourth example aircraft 106D, a fifth example aircraft 106E, and a sixth example aircraft 106F. The aircraft 106A-F of FIG. 1 are manned commercial aircraft (e.g., cargo aircraft, passenger aircraft, etc., having one or more human pilots onboard to control and/or otherwise fly the aircraft). Alternatively, one or more of the aircraft 106A-F of FIG. 1 may be an unmanned aerial vehicle (UAV) (e.g., a drone, a remotely piloted aircraft system (RPAS), etc.). Alternatively, the ART management environment 100 may include fewer or more aircraft than the aircraft 106A-F depicted in FIG. 1.

In the illustrated example of FIG. 1, the first ARTCC 105A is in communication with the first aircraft 106A and the second aircraft 106B. For example, the first ARTCC 105A can track the first aircraft 106A and/or the second aircraft 106B via radar while the first aircraft 106A and/or the second aircraft 106B are in a sector monitored by the first ARTCC 105A. In other examples, the first aircraft 106A and/or the second aircraft 106B can transmit (e.g., wirelessly transmit) data to the first ARTCC 105A. In such examples, the data can include one or more data messages based on and/or otherwise having a FIXM format (e.g., a FIXM message, a FIXM data message, etc.). Likewise, in FIG. 1, the second ARTCC 105B is in communication with the third aircraft 106C and the fourth aircraft 106D. Alternatively, the first ARTCC 105A may be in communication with fewer or more aircraft than the first and second aircraft 106A-B depicted in FIG. 1. Alternatively, the second ARTCC 105B may be in communication with fewer or more aircraft than the third and fourth aircraft 106C-D depicted in FIG. 1.

In some examples, the aircraft 106A-D obtain and/or otherwise aggregate data of interest associated with the aircraft 106A-D to be transmitted to a respective one of the ARTCCs 105A-B. For example, the first aircraft 106A can identify data (e.g., aircraft data, flight data, etc.) of interest that is collected, determined, and/or otherwise generated by a computing system (e.g., a flight control computer (FCC), a remote electronic unit (REU), etc.) of the first aircraft 106A. In such examples, the computing system of the first aircraft 106A can identify aircraft data including an aircraft or flight number of the first aircraft 106A, a make and/or model of the first aircraft 106A, etc. In some examples, the computing system of the first aircraft 106A can identify aircraft data including one or more characteristics or parameters (e.g., flight characteristics, flight parameters, etc.) associated with the first aircraft 106A, such as a location or position (e.g., an altitude, a latitude, a longitude, etc., and/or a combination thereof) of the first aircraft 106A, an air speed of the first aircraft 106A, waypoint information (e.g., a previous waypoint, a current or instant waypoint, an upcoming waypoint, etc.), etc.

In some examples, the aircraft 106A-D format, package, and/or otherwise compile aircraft data as one or more FIXM messages. For example, the first aircraft 106A can generate one or more FIXM messages based on aircraft data collected, determined, and/or otherwise generated by a computing system of the first aircraft 106A. In some examples, the aircraft 106A-D transmit the one or more FIXM messages to a respective one of the ARTCCs 105A-B with which the transmitting one(s) of the aircraft 106A-D is/are in contact or communication. For example, FIXM messages transmitted by the aircraft 106A-D to the ARTCCs 105A-B can correspond to ART data.

In the illustrated example of FIG. 1, the ART management environment 100 includes an example ART data system 108 to aggregate and/or otherwise obtain ART data from the ARTCCs 105A-B. For example, the first ARTCC 105A can transmit ART data obtained from the first and second aircraft 106A-B to the ART data system 108 and the second ARTCC 105B can transmit ART data obtained from the third and fourth aircraft 106C-D to the ART data system 108. The ART data system 108 of FIG. 1 can correspond to and/or otherwise be representative of one or more processor platforms that collect ART data from the ARTCCs 105A-B. In FIG. 1, the ART data system 108 can correspond to the TFM Data Service managed by the FAA.

In the illustrated example of FIG. 1, the ART management environment 100 includes a first example network (NETWORK 1) 110 to facilitate communication (e.g., a transmission of and/or a reception of data) between at least one of the ART prediction system 104, the ART data system 108, first example computing system(s) 112, or second example computing system(s) 114. The first network 110 of the illustrated example of FIG. 1 is the System Wide Information Management (SWIM) network. SWIM is a global air traffic management (ATM) industry initiative to harmonize the exchange of Aeronautical, Flight, and Weather information for all airspace users and stakeholders. Within the FAA, the FAA SWIM program is an advanced technology program designed to facilitate greater sharing of ATM system information, such as airport operational status, flight data, status of special use airspace, NAS restrictions, weather information, etc. In some examples, the FAA SWIM program can coordinate and/or otherwise facilitate the exchange of weather data from the National Oceanic and Atmospheric Administration (NOAA). In such examples, weather data, such as atmospheric pressure, wind speed, etc., can be collected from the NOAA via the SWIM network. In some examples, the weather data can be included in FIXM messages from the FAA SWIM program and can be obtained via the first network 110. In some examples, the weather data can be included in different data messages (e.g., not included in FIXM messages) from the NOAA and can be obtained via the first network 110.

In some examples, the SWIM network includes, corresponds to, and/or otherwise is representative of a plurality of computer servers, network switches, etc., to implement a data sharing network. Additionally or alternatively, the first network 110 may be the Internet. However, the first network 110 can be implemented using any suitable wired and/or wireless network(s) including, for example, one or more data buses, one or more Local Area Networks (LANs), one or more wireless LANs, one or more cellular networks, one or more private networks, one or more public networks, etc.

In the illustrated example of FIG. 1, the ART management environment 100 includes the first computing system(s) 112 to direct operations of a fleet of aircraft of an airline based on ART data, where the aircraft fleet includes the fifth aircraft 106E. For example, the first computing system(s) 112 can obtain ART data from the ART data system 108 via the first network 110. In some examples, the first computing system(s) 112 correspond to one or more processor platforms associated with an airline. For example, the first computing system(s) 112 can correspond to one or more mobile devices, tablet computers, etc., that can be used by a pilot of the fifth aircraft 106E to evaluate a flight plan to be executed by the fifth aircraft 106E.

In some examples, the first computing system(s) 112 correspond to one or more servers that are controlled, managed, etc., by an airline to direct operation of the aircraft fleet including the fifth aircraft 106E. For example, the first computing system(s) 112 can obtain ART data via the first network 110 and direct operation of the fifth aircraft 106E based on the obtained ART data. In such examples, the first computing system(s) 112 can determine a flight plan of the fifth aircraft 106E based on the obtained ART data, adjust the flight plan of the fifth aircraft 106E based on the obtained ART data, etc. In some examples, the first computing system(s) 112 adjusts the flight plan of the fifth aircraft 106E while the fifth aircraft 106E is parked on a ground surface.

In some examples, the first computing system(s) adjusts the flight plan of the fifth aircraft 106E while the fifth aircraft 106E is in flight executing the flight plan.

In the illustrated example of FIG. 1, the ART management environment 100 includes the ART prediction system 104 to improve aircraft traffic control in connection with controlling operations associated with the first through sixth aircraft 106A-F. In some examples, the ART prediction system 104 determines existing traffic counts of one or more sectors monitored by the ART management environment 100 based on ART data obtained from the first network 110. For example, the ART prediction system 104 can determine a current or instantaneous quantity of aircraft in a specified sector based on a plurality of FIXM messages obtained from the ART data system 108 and/or the first network 110 via the first network 110.

In some examples, the ART prediction system 104 determines and/or otherwise predicts traffic counts of one or more sectors during a time period of interest that has not yet occurred. For example, the ART prediction system 104 can predict a number of aircraft that can be flying in a sector 15 minutes in advance, one hour in advance, one week in advance, etc.

In some examples, the ART prediction system 104 determines future traffic counts in response to executing a plurality of ML models on ART data obtained from the first network 110. For example, the ART prediction system 104 can execute a variety of different ML models (e.g., different types of ML models) and determine which of the different ML models achieves the best performance based on specified criteria. For example, the ART prediction system 104 can evaluate performance of the different ML models using cross-validation techniques. In other examples, the ART prediction system 104 can execute the different ML models using ART data associated with a first sector having a known traffic count. In such examples, a first ML model of the ML models can be chosen, identified, etc., based on the first ML model determining a traffic count having a value that matches or which is substantially close (e.g., within a standard deviation) to the known traffic count, or, which has the least amount of error when compared to traffic counts generated by the other ML models. Advantageously, the ART prediction system 104 can execute the first ML model to determine a traffic count for a sector of interest for an upcoming time period, a time period not yet occurred, a future time period, etc.

In the illustrated example of FIG. 1, the ART management environment 100 includes the ART prediction system 104 to transmit determined, predicted, etc., traffic count(s) for sector(s) of interest to the second computing system(s) 114 via a second example network 116. In some examples, the second computing system(s) 114 direct operations of an airline aircraft fleet based on the traffic count(s) determined by the ART prediction system 104, where the airline aircraft fleet includes the sixth aircraft 106F. For example, the second computing system(s) 114 can obtain traffic count(s) for sector(s) of interest from the ART prediction system 104 via the second network 116. In some examples, the second computing system(s) 114 correspond to one or more processor platforms associated with an airline. For example, the second computing system(s) 114 can correspond to one or more mobile devices, tablet computers, etc., that can be used by a pilot of the sixth aircraft 106F to evaluate a flight plan to be executed by the sixth aircraft 106F.

In some examples, the second computing system(s) 114 correspond to one or more servers that are controlled, managed, etc., by an airline to direct operation of the airline aircraft fleet including the sixth aircraft 106F. For example, the second computing system(s) 114 can obtain traffic counts for a plurality of sectors via the second network 116 and direct operation of the sixth aircraft 106F based on the obtained traffic counts. In such examples, the second computing system(s) 114 can determine a flight plan of the sixth aircraft 106F based on the obtained traffic counts prior to the sixth aircraft 106F taking off, adjust the flight plan of the sixth aircraft 106F based on the obtained traffic counts while in flight, etc., and/or a combination thereof.

In the illustrated example of FIG. 1, the second network 116 is the Internet. However, the second network 116 can be implemented using any suitable wired and/or wireless network(s) including, for example, one or more data buses, one or more LANs, one or more wireless LANs, one or more cellular networks, one or more private networks, one or more public networks, etc.

Figure 2:
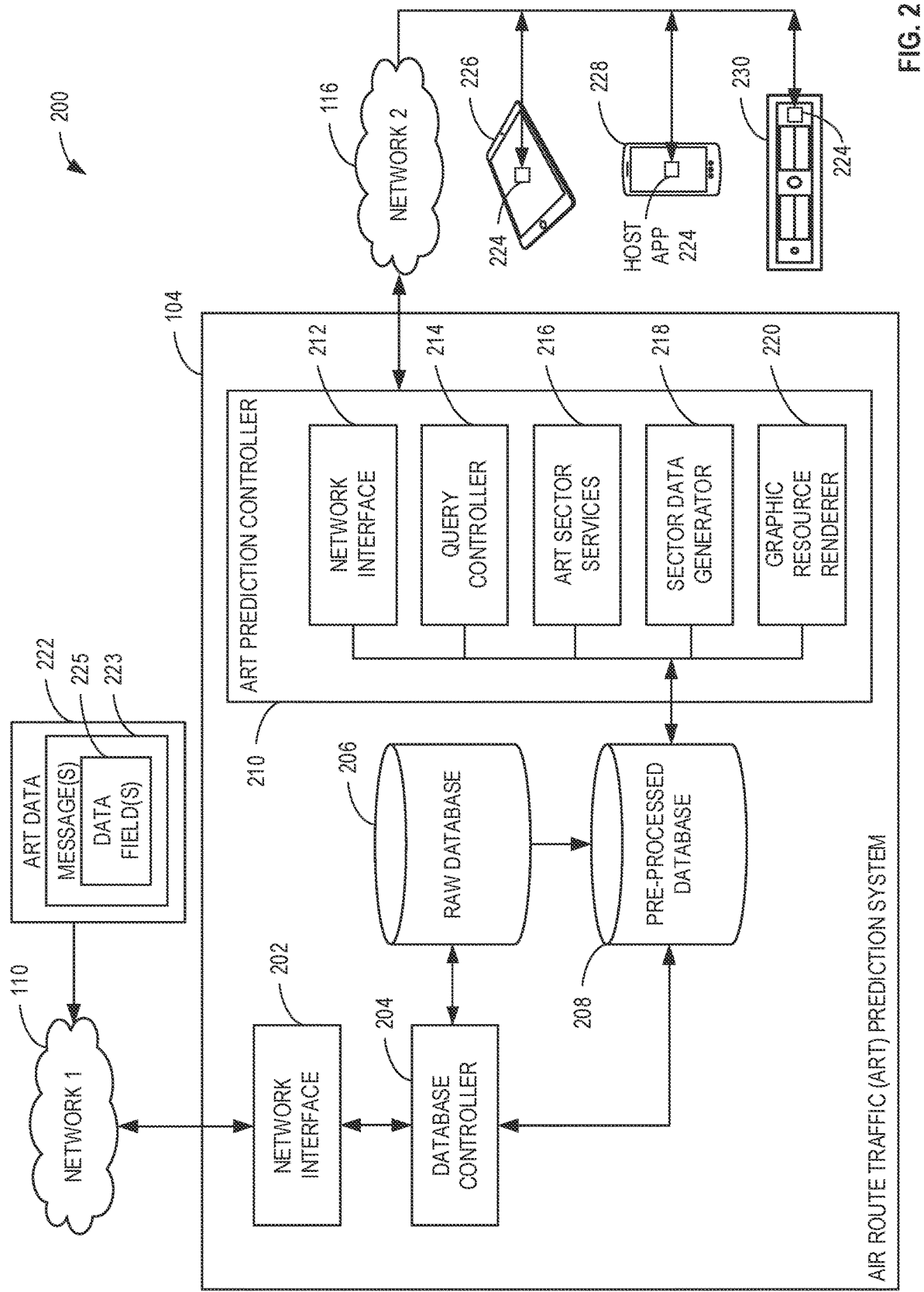
FIG. 2 depicts an example traffic count determination system including an example implementation of the ART prediction system of FIG. 1 that includes a database controller and an ART prediction controller that includes ART sector services.

FIG. 2 depicts an example traffic count determination system 200 including an example implementation of the ART prediction system 104 of FIG. 1 to determine traffic counts for sector(s) of interest based on example ART data 222 obtained from the first network 110 of FIG. 1. In the illustrated example of FIG. 2, the ART prediction system 104 includes a first example network interface 202, an example database controller 204, a first example database (RAW DATABASE) 206, a second example database (PREPROCESSED DATABASE) 208, and an example ART prediction controller 210. In FIG. 2, the ART prediction controller 210 includes a second example network interface 212, an example query controller 214, example ART sector services 216, an example sector data generator 218, and an example graphic resource renderer 220.

In the illustrated example of FIG. 2, the ART prediction system 104 includes the first network interface 202 to obtain information from and/or transmit information to the first network 110 of FIG. 1. In the illustrated example, the first network interface 202 implements a web server that receives and/or otherwise obtains the ART data 222 via the first network 110. For example, the ART data 222 can be generated by the ART data system 108 of FIG. 1, one or more of the ARTCCs 105A-B of FIG. 1, one or more of the aircraft 106A-F of FIG. 1, etc., and/or a combination thereof. In FIG. 2, the ART data 222 includes one or more example messages (e.g., data messages, FIXM messages, etc.) 223. In FIG. 2, each of the one or more messages 223 include one or more example data fields 225. In some examples, the data field(s) 225, the message(s) 223, and/or, more generally, the ART data 222, includes aircraft data associated with one or more of the first through sixth aircraft 106A-F, weather data or information associated with one or more sectors, waypoint information, etc. For example, a first one of the data fields 225 can be a header including data indicative of a message type. In other examples, one or more of the data fields 225 can be payload field(s) including aircraft data, weather data, etc.

In some examples, the ART data 222 is formatted as FIXM messages. For example, the message(s) 223 can be FIXM messages, which can be transmitted from the first network 110 to the first network interface 202 using Transmission Control Protocol/Internet Protocol (TCP/IP), Hyper Text Transfer Protocol (HTTP), etc. However, any other message format and/or protocol may additionally or alternatively be used such as, for example, a file transfer protocol (FTP), a simple message transfer protocol (SMTP), an HTTP secure (HTTPS) protocol, etc.

In the illustrated example of FIG. 2, the ART prediction system 104 includes the database controller 204 to generate and/or update the first database 206, the second database 208, etc., based on the ART data 222. In some examples, the database controller 204 generates the first database 206 by identifying FIXM messages 223 of interest included in the ART data 222 to be stored in the first database 206. For example, the first database 206 can be representative of a raw database, or a raw ART data database, because the first database 206 can store unaltered portions or entireties of the FIXM messages 223.

In some examples, the database controller 204 inspects a header of a FIXM message 223, determines a type (e.g., a message type, a type of object, etc.) of the FIXM message 223, and determines whether to store the FIXM message 223 in the first database 206 based on the type. In such examples, the database controller 204 can determine that a first FIXM message has a first message type of aircraft object, a second FIXM message has a second message type of weather object, etc. For example, the aircraft object can be a data object including one or more of the data fields 225 each including aircraft data such as a flight number of an aircraft, a location of the aircraft, a characteristic of the aircraft, a timestamp corresponding to generation of the aircraft or ART data, etc., and/or a combination thereof. In other examples, the weather object can be a data object including one or more data fields each having weather data or information such as atmospheric pressure, humidity, precipitation quantity and/or type (e.g., hail, rain, snow, sleet, etc.) wind direction, wind speed, etc., and/or a combination thereof.

In some examples, the database controller 204 stores the message(s) 223 as database entries in the first database 206. For example, the database controller 204 can store a portion and/or an entirety of the first FIXM message as a first database entry having one or more database entry fields. In such examples, the database controller 204 can store a flight number included in the first FIXM message in a first database entry field of the first database entry. In other examples, the database controller 204 can store departure information (e.g., a timestamp representative of when an aircraft departed or took off from an airport), arrival information (e.g., a timestamp representative of when an aircraft arrived or landed at an airport), a flight sector in which an aircraft is located during a time period, a waypoint, etc., in one or more database entry fields of the first database entry. In yet other examples, the database controller 204 can store other data messages (e.g., weather data messages from the NOAA) that include an atmospheric pressure, a wind speed, etc., or any other type of weather data that is associated with a sector in a second database entry field of the second database entry. In such examples, the weather data messages can be obtained via the first network 110 of FIG. 1 or any other network associated with the ART management environment 100 of FIG. 1.

Advantageously, the database controller 204 can identify and store relevant FIXM messages 223 in the first database 206 based on a message type, and improve aircraft traffic control by storing relevant FIXM messages 223 rather than storing and analyzing extraneous FIXM messages 223 that may not be relevant to aircraft traffic control for sector(s) of interest. For example, the database controller 204 can discard a portion or an entirety of one or more FIXM messages 223 of the ART data 222 based on the header of a FIXM message 223, the data included in the FIXM message 223, etc.

In some examples, the database controller 204 generates the second database 208 by indexing first database entries of the first database 206 based on a database entry field, updating the first database entries with sector information, generating second database entries of the second database 208 based on the sector information, and populating the second database entries based on the sector information. For example, the database controller 204 can index the first database entries included in the first database 206 based on flight number. In such examples, the database controller 204 can update the first database entries with sector information such as departure information, arrival information, flight sector information (e.g., a sector name or identifier), waypoint information, weather information, etc. The database controller 204 can generate the second database entries in the second database 208 and identify the second database entries by a respective one of the sector names included in the first database 206.

In some examples, in response to generating the second database entries, the database controller 204 populates the second database entries by mapping data from the first database 206 to the second database 208, where the data is associated with the respective sector name. For example, the database controller 204 can map one or more of the first database entries having a first flight number to one or more of the second database entries having the first flight number. In such examples, the database controller 204 can store data included in the one or more of the first database entries in the one or more of the second database entries. In other examples, the database controller 204 can correlate information included in the populated ones of the second database entries. For example, the database controller 204 can correlate departure airports, arrival airports, aircraft types, airline names, etc., with corresponding ones of the sector names. Advantageously, the database controller 204 can improve operation of the second database 208 (e.g., indexing the second database 208, querying the second database 208, etc.) by executing data structuring, ordering, etc., operations on a reduced set of data included in the second database 208 compared to the first database 206.

In the illustrated example of FIG. 2, the ART prediction system 104 includes the databases 206, 208 to record data (e.g., the data field(s) 225, the message(s) 223, and/or, more generally, the ART data 222). The databases 206, 208 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The databases 206, 208 can additionally or alternatively be implemented by one or more double data rate (DDR) memories, such as DDR, DDR2, DDR3, DDR4, mobile DDR (mDDR), etc. The databases 206, 208 can additionally or alternatively be implemented by one or more mass storage devices such as hard disk drive(s), compact disk drive(s), digital versatile disk drive(s), solid-state disk drive(s), etc. While in the illustrated example the databases 206, 208 are illustrated as single databases, the databases 206, 208 can be implemented by any number and/or type(s) of databases. Furthermore, the data stored in the databases 206, 208 may be in any data format such as, for example, binary, comma delimited, hexadecimal, JavaScript Object Notation (JSON), tab delimited, Structured Query Language (SQL), XML, etc.

In the illustrated example of FIG. 2, the ART prediction system 104 includes the ART prediction controller 210 to execute one or more ML models to determine traffic counts for sectors of interest. In FIG. 2, the ART prediction controller 210 includes the second network interface 212 to obtain information from and/or transmit information to example computing devices (e.g., processor platforms) 226, 228, 230 via the second network 116 of FIG. 1. In FIG. 2, the second network interface 212 implements a web server that receives requests from the computing devices 226, 228, 230. In FIG. 2, the second network interface 212 can implement the web server to transmit data to the computing devices 226, 228, 230, where the data can include traffic counts for sectors of interest, graphic resource renderings based on the traffic counts, data reports including the traffic counts, the graphic resource renderings, recommendations to adjust flight plans of the aircraft 106A-F of FIG. 1, etc. In FIG. 2, the second network interface 212 can receive and/or transmit information formatted as an HTTP message. However, any other message format and/or protocol may additionally or alternatively be used such as, for example, a FTP, a SMTP, an HTTPS protocol, etc.

In the illustrated example of FIG. 2, the ART prediction controller 210, and/or, more generally, the ART prediction system 104, retrieves and/or otherwise obtains requests from an example host application (HOST APP) 224 operating and/or otherwise executing on the computing devices 226, 228, 230. In FIG. 2, the host application 224 includes one or more routines (e.g., software routines) or programs (e.g., software programs) executed by machine readable instructions. For example, the host application 224 can be an aircraft traffic control related software application operating on a standard operating system (e.g., a WINDOWS™-based operating system, an APPLE® MACOS® operating system, an APPLE® IOS® operating system, an ANDROID™ operating system, a LINUX® operating system, etc.). The host application 224 is executed by the computing devices 226, 228, 230 to enable a user, an airline, etc., to obtain data or information associated with one or more sectors of interest.

In the illustrated example of FIG. 2, the computing devices 226, 228, 230 include a first example computing device 226, a second example computing device 228, and a third example computing device 230. In FIG. 2, the first computing device 226 is an Internet-enabled tablet (e.g., an APPLE IPAD®, a MICROSOFT SURFACE®, etc.) capable of facilitating an interaction with the ART prediction system 104, and/or, more generally, the ART prediction controller 210, via the host application 224. For example, the first computing device 226 can be used by flight crew while onboard one of the aircraft 106A-F of FIG. 1.

In the illustrated example of FIG. 2, the second computing device 228 is an Internet-enabled mobile handset (e.g., a smartphone) and, thus, can facilitate an interaction with the ART prediction controller 210, and/or, more generally, the ART prediction system 104, via the host application 224. For example, the second computing device 228 can be used by flight crew while onboard one of the aircraft 106A-F of FIG. 1.

In the illustrated example of FIG. 2, the third computing device 230 is a server. For example, the third computing device 230 can be a physical server (e.g., a rack-mounted server, a blade server, etc.), a virtual server (e.g., one or more virtual machines composed of virtual hardware resources (e.g., virtual compute resources, virtual network resources, virtual storage resources, etc.), etc., and/or a combination thereof and, thus, can facilitate an interaction with the ART prediction controller 210, and/or, more generally, the ART prediction system 104, via the host application 224. Alternatively, the ART prediction system 104 may facilitate an interaction with fewer or more than the quantity and/or type of computing devices than the computing devices 226, 228, 230 depicted in FIG. 2.

Although the host application 224 of FIG. 2 is depicted as being the same on each of the computing devices 226, 228, 230, alternatively, the host application 224 may be tailored and/or otherwise customized based on the corresponding platform. For example, the host application 224 executing on the first computing device 226 may be different than the host application 224 executing on the second computing device 228. In such examples, the host application 224 can have a different user interface, different communication drivers, different application programming interfaces (APIs), etc., to interoperate with the corresponding platform.

In the illustrated example of FIG. 2, the ART prediction controller 210 includes the query controller 214 to generate commands (e.g., machine readable commands), directions (e.g., machine readable directions), instructions (e.g., machine readable instructions), etc., to the ART prediction controller 210 based on a request, a query, etc., obtained from the second network 116. In some examples, the query controller 214 generates a query to the second database 208 based on a first request from the host application 224 of the first computing device 226, where the first request is to obtain a first traffic count of a first sector during a near-current or instant time period. In such examples, in response to the query, the second database 208 can transmit the first traffic count to the query controller 214 to be transmitted to the first computing device 226.

In some examples, the query controller 214 generates a first command based on a second request from the host application 224 of the first computing device 226, where the second request is to obtain a first traffic count of a first sector during a future time period. In such examples, the query controller 214 can invoke the ART sector services 216 via the first command to execute an ML model to determine the first traffic count.

In some examples, the query controller 214 configures one or more request parameters for a traffic count request from the computing devices 226, 228, 230. In such examples, the query controller 214 can identify a request parameter such as a sector name, a bucket or time range, a sector output type, etc., based on the request. For example, a sector output type can be a sector count for a sector during a time period of interest, a sector count parameter such as a mean sector count representative of an average sector count for a sector during a time period of interest, a predicted sector count for a sector during a time period of interest, etc.

In some examples, the query controller 214 generates a second command based on a third request from the host application 224 of the second computing device 228, where the third request is to obtain a graphic resource rendering of traffic counts for a plurality of sectors. In such examples, the query controller 214 can invoke the graphic resource renderer 220 via the second command to generate the graphic resource rendering of the traffic counts for the plurality of the sectors.

In the illustrated example of FIG. 2, the ART prediction controller 210 includes the ART sector services 216 to determine and/or otherwise predict traffic counts for sectors of interest by executing one or more ML models. In some examples, the ART sector services 216 include and/or are otherwise representative of one or more services (e.g., microservices, containerized applications (e.g., virtual containers), etc.) that, when executed, can execute a specified computing task. For example, the ART sector services 216 can include a first service to obtain a traffic count from the second database 208. In other examples, the ART sector services 216 can include a second service to train one or more ML models based on the ART data 222, execute the one or more ML models based on the ART data 222, etc. In yet other examples, the ART sector services 216 can include a third service to configure a sector count operation (e.g., determine a sector to process, a time range of the ART data 222 to process in connection with the sector, etc.), a fourth service to determine traffic counts, a fifth service to determine parameters (e.g., airspace sector count parameters, airspace traffic count parameters, sector count parameters, traffic count parameters, etc.) or statistics associated with the traffic counts, a sixth service to predict future traffic counts, etc.

In some examples, the ART sector services 216, the ART prediction controller 210, and/or, more generally, the ART prediction system 104, can be implemented and/or otherwise executed by virtual hardware resources. For example, the ART sector services 216 can be deployed and/or otherwise hosted on a cloud computing platform. In such examples, the ART sector services 216 can be executed using virtual compute resources (e.g., virtualizations of physical central processing units (CPUs), virtual storage resources (e.g., virtualizations of physical memory, hard-disc drives, solid-state disc drives, etc.), virtual network resources (e.g., virtualizations of network switches, network routers, spline switches, top-of-the-rack switches, edge gateways, etc.), etc., and/or a combination thereof.

In the illustrated example of FIG. 2, the ART prediction controller 210 includes the sector data generator 218 to package sector data to be transmitted to the host application 224 of the computing devices 226, 228, 230. In some examples, the sector data generator 218 obtains traffic counts from the ART sector services 216, graphic resource renderings from the graphic resource renderer 220, etc. In such examples, the sector data generator 218 can encapsulate and/or otherwise convert the traffic counts, the graphic resource renderings, etc., into a data format that is readable by a requesting one of the computing devices 226, 228, 230. For example, the first computing device 226 can require data obtained from the ART prediction controller 210, and/or, more generally, the ART prediction system 104, in a first data format while the third computing device 230 can require obtained data to be in a second data format different from the first data format.

In some examples, the sector data generator 218 generates a recommendation to adjust a flight plan of an aircraft based on traffic counts. For example, the sector data generator 218 can determining that a traffic count of a sector during a time period satisfies a threshold (e.g., a threshold value) representative of a suggested, pre-determined, etc., maximum quantity of aircraft to fly in the sector during the time period.

In some examples, the sector data generator 218 can obtain a first predicted traffic count for a first sector and a second predicted traffic count for a second sector (e.g., from the ART sector services 216) at a first time period, where the predicted traffic counts are for a second time period after the first time period. The sector data generator 218 can determine that the first sector is predicted to have a first traffic count of 100 and the second sector is predicted to have a second traffic count of 50 at the second time period, where the threshold value is 75. The sector data generator 218 can compare the first traffic count and the second traffic count to the threshold value.

In response to determining that the first traffic count is greater than the threshold value and, thus, satisfies the threshold value, the sector data generator 218 can determine to generate a recommendation to divert aircraft from the first sector during the second time period. For example, the sector data generator 218 can generate a recommendation to adjust flight plans of aircraft that include the first sector to new flight plans that include the second sector. In such examples, the sector data generator 218 can transmit the recommendation to one of the computing devices 226, 228, 230. In response to obtaining the recommendation, the computing device(s) 226, 228, 230 can instruct an aircraft on a ground surface, in flight, etc., that has a flight plan including the first sector to be redirected to the second sector during the second time period. Advantageously, the sector data generator 218 and/or, more generally, the ART prediction system 104 can alleviate sector congestion by predicting future traffic counts and adjusting flight plans to avoid the congested sectors based on the predicted traffic counts.

In the illustrated example of FIG. 2, the ART prediction controller 210 includes the graphic resource renderer 220 to generate visual data for an administrator, a user, etc., associated with the computing devices 226, 228, 230. For example, the graphic resource renderer 220 can generate a graph, a plot, a table, etc., or any other type of graphical image or data that can be rendered into a graphical representation of the data. In such examples, the graphic resource renderer 220 can generate machine readable instructions that, when executed by one of the computing devices 226, 228, 230, can generate a graphical representation of requested data on a display, a user interface, etc., of the one of the computing devices 226, 228, 230.

While an example manner of implementing the ART prediction system 104 of FIG. 1 is illustrated in FIG. 2, one or more of the elements, processes and/or devices illustrated in FIG. 2 may be combined, divided, re-arranged, omitted, eliminated and/or implemented in any other way. Further, the first example network interface 202, the example database controller 204, the first example database 206, the second example database 208, the example ART prediction controller 210, the second example network interface 212, the example query controller 214, the example ART sector services 216, the example sector data generator 218, the example graphic resource renderer 220, and/or, more generally, the example ART prediction system 104 of FIG. 1 may be implemented by hardware, software, firmware and/or any combination of hardware, software and/or firmware. Thus, for example, any of the first example network interface 202, the example database controller 204, the first example database 206, the second example database 208, the example ART prediction controller 210, the second example network interface 212, the example query controller 214, the example ART sector services 216, the example sector data generator 218, the example graphic resource renderer 220, and/or, more generally, the example ART prediction system 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the first example network interface 202, the example database controller 204, the first example database 206, the second example database 208, the example ART prediction controller 210, the second example network interface 212, the example query controller 214, the example ART sector services 216, the example sector data generator 218, and/or the example graphic resource renderer 220 is/are hereby expressly defined to include a non-transitory computer readable storage device or storage disk such as a memory, a digital versatile disk (DVD), a compact disk (CD), a Blu-ray disk, etc., including the software and/or firmware. Further still, the example ART prediction system 104 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
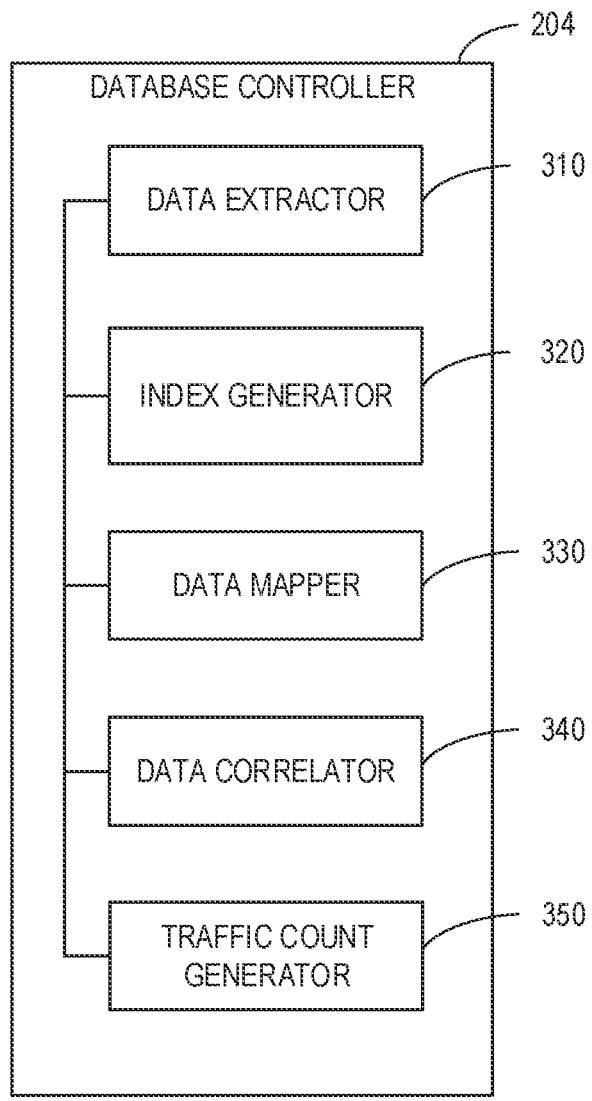
FIG. 3 is an example implementation of the database controller of FIG. 2.

FIG. 3 is an example implementation of the database controller 204 of FIG. 2. In some examples, the database controller 204 generates the first database 206 and the second database 208. In some examples, the database controller 204 determines portions of and/or entireties of the message(s) 223 of FIG. 2 (e.g., FIXM messages) included in the ART data 222 of FIG. 2 to be stored in at least one of the first database 206 or the second database 208. In the illustrated example of FIG. 3, the database controller 204 includes an example data extractor 310, an example index generator 320, an example data mapper 330, an example data correlator 340, and an example traffic count generator 350.

In the illustrated example of FIG. 3, the database controller 204 includes the data extractor 310 to identify information of interest included in the ART data 222 of FIG. 2 to be stored in the first database 206. In some examples, the data extractor 310 stores the identified information of interest as database entries in the first database 206. For example, the data extractor 310 can store a first FIXM message (e.g., a first one of the message(s) 223) as a first database entry, a second FIXM message (e.g., a second one of the message(s) 223) as a second database entry, a first portion (e.g., one or more of the data field(s) 225) of a third FIXM message (e.g., a third one of the message(s) 223) as a third database entry, a second portion (e.g., one or more of the data field(s) 225) and a third portion (e.g., one or more of the data field(s) 225) of a fourth FIXM message (e.g., a fourth one of the message(s) 223) as a fourth database entry, etc., in the first database 206.

In some examples, the data extractor 310 evaluates the ART data 222 based on a set of one or more rules (e.g., inspection rules, storage rules, etc.). In some examples, the data extractor 310 parses the message(s) 223 to identify one or more of the data field(s) 225. In some examples, the data extractor 310 inspects a first one of the data field(s) 225, compares a value of the first one of the data field(s) 225 to one or more rules, and determines whether the value violates one of the one or more rules based on the comparison.

In some examples, the data extractor 310 stores an entirety of one or more of the message(s) 223 based on a comparison of the one or more message(s) 223 to one or more rules. For example, the data extractor 310 can inspect a first FIXM message included in the message(s) 223 that includes a first data field, a second data field, and a third data field of the data field(s) 225. In such examples, in response to determining that none of the data fields violate a rule, the data extractor 310 can store the first FIXM message in the first database 206.

In some examples, the data extractor 310 discards an entirety of the first FIXM message based on the comparison. For example, the data extractor 310 can determine that the first data field is a header of the first FIXM message and the header includes data representative of a first message type. In such examples, the data extractor 310 can compare the first message type to a rule indicative of discarding entire FIXM messages having the first message type.

In some examples, the data extractor 310 discards a portion of a FIXM message based on the comparison. For example, the data extractor 310 can determine that the second data field is a first payload data field and the first payload data field includes data representative of a first type of aircraft. In such examples, the data extractor 310 can compare the first aircraft type to a rule indicative of discarding payload data fields associated with the first aircraft type.

In some examples, the data extractor 310 discards a first portion of a FIXM message while storing a second portion of the FIXM message. For example, the data extractor 310 can discard the first payload data field based on the first payload data field violating a rule. In such examples, the data extractor 310 can determine that the third data field is a second payload data field and the second payload data field includes data representative of weather information associated with a first sector. In such examples, the data extractor 310 can compare the first sector to a rule indicative of storing payload fields associated with the first sector. In other examples, the data extractor 310 can compare the first sector to a different rule indicative of discarding payload fields associated with a second sector different from the first sector. In such examples, the data extractor 310 can store payloads associated with the first sector and discard payloads associated with the second sector.

In the illustrated example of FIG. 3, the database controller 204 includes the index generator 320 to index at least one of the first database 206 or the second database 208. In some examples, the data extractor 310 stores a plurality of first database entries based on the ART data 222 in the first database 206. In such examples, the index generator 320 can index the first database entries based on a data field included in the first database entries. For example, the index generator 320 can index the first database entries based on a flight number, a sector name or identifier, etc. Advantageously, the index generator 320 can optimize and/or otherwise improve the performance of the first database 206 by reducing a number of read accesses (e.g., accessed by a storage disc or storage device) to execute a query to the first database 206.

In some examples, the index generator 320 generates second database entries in the second database 208 based on first database entries in the first database 206. For example, the index generator 320 can determine that the first database entries stored in the first database 206 are indexed by flight number. In such examples, the index generator 320 can generate the second database entries based on flight number. For example, the index generator 320 can generate a database entry in the second database 208 for each of the flight numbers indexed in the first database 206. In such examples, each of the generated database entries in the second database 208 can include a database entry field storing the flight number. For example, the index generator 320 can (1) identify a flight number of 1201 in one of the first database entries and (2) generate a database entry in the second database 208 having a database entry field including the flight number 1201.

In the illustrated example of FIG. 3, the database controller 204 includes the data mapper 330 to associate data included in first database entries stored in the first database 206 to second database entries stored in the second database 208. In some examples, the data mapper 330 populates the second database entries by mapping one or more of the first database entries to one or more of the second database entries based on a database entry field. For example, the data mapper 330 can identify (1) a first set of the first database entries that include a database entry field representative of the flight number 1201 and (2) a second set of the second database entries that include a database entry field representative of the flight number 1201.

In some examples, in response to the identifications, the data mapper 330 stores a portion of and/or an entirety of data included in the first set in the second set. For example, the data mapper 330 can identify a first database entry in the first database 206, where the first database entry has three data fields with one of the three data fields including the flight number 1201. In such examples, the data mapper 330 can identify a second database entry in the second database 208, where the second database entry has a data field including the flight number 1201. In response to identifying the second database entry, the data mapper 330 can store the second and the third database entry fields of the first database entry as second and third database entry fields in the second database entry.

In the illustrated example of FIG. 3, the database controller 204 includes the data correlator 340 to correlate data internal to at least one of the first database 206 or the second database 208 to determine sector information. In some examples, the sector information includes a sector name identifying a sector. In some examples, the sector information includes a sector entry time of an aircraft (e.g., the aircraft 106A-F of FIG. 1) representative of when the aircraft enters a sector. In some examples, the sector information includes a sector exit time of the aircraft representative of when the aircraft exits the sector. In some examples, the data correlator 340 determines the sector information by identifying database entries stored in the second database 208 that are associated with a sector. For example, the data correlator 340 can determine to process a first sector of interest by identifying a first sector name in the second database 208 corresponding to the first sector. The data correlator 340 can identify one or more of the aircraft 106A-F of FIG. 1 that have entered and/or exited the first sector by correlating data included in the database entries of the second database 208 based on the sector information.

In the illustrated example of FIG. 3, the database controller 204 includes the traffic count generator 350 to determine a traffic count based on database entries included in the second database 208. In some examples, the traffic count generator 350 determines a quantity of the aircraft 106A-F that are in a first sector for a time period of interest based on the correlated data (e.g., the corresponding sector entry times and/or the sector exit times included in the second database entries as determined by the data correlator 340). Advantageously, the traffic count generator 350 can determine traffic counts for a sector of interest and a time period of interest based on sector entry times and sector exit times that are identified in response to correlating internal database entries to the second database 208 based on sector information.

While an example manner of implementing the database controller 204 of FIG. 2 is illustrated in FIG. 3, one or more of the elements, processes and/or devices illustrated in FIG. 3 may be combined, divided, re-arranged, omitted, eliminated and/or implemented in any other way. Further, the example data extractor 310, the example index generator 320, the example data mapper 330, the example data correlator 340, the example traffic count generator 350, and/or, more generally, the example database controller 204 of FIG. 2 may be implemented by hardware, software, firmware and/or any combination of hardware, software and/or firmware. Thus, for example, any of the example data extractor 310, the example index generator 320, the example data mapper 330, the example data correlator 340, the example traffic count generator 350, and/or, more generally, the example database controller 204 could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example data extractor 310, the example index generator 320, the example data mapper 330, the example data correlator 340, and/or the example traffic count generator 350 is/are hereby expressly defined to include a non-transitory computer readable storage device or storage disk such as a memory, a DVD, a CD, a Blu-ray disk, etc., including the software and/or firmware. Further still, the example database controller of FIG. 2 may include one or more elements, processes and/or devices in addition to, or instead of, those illustrated in FIG. 3, and/or may include more than one of any or all of the illustrated elements, processes and devices.

Figure 4:
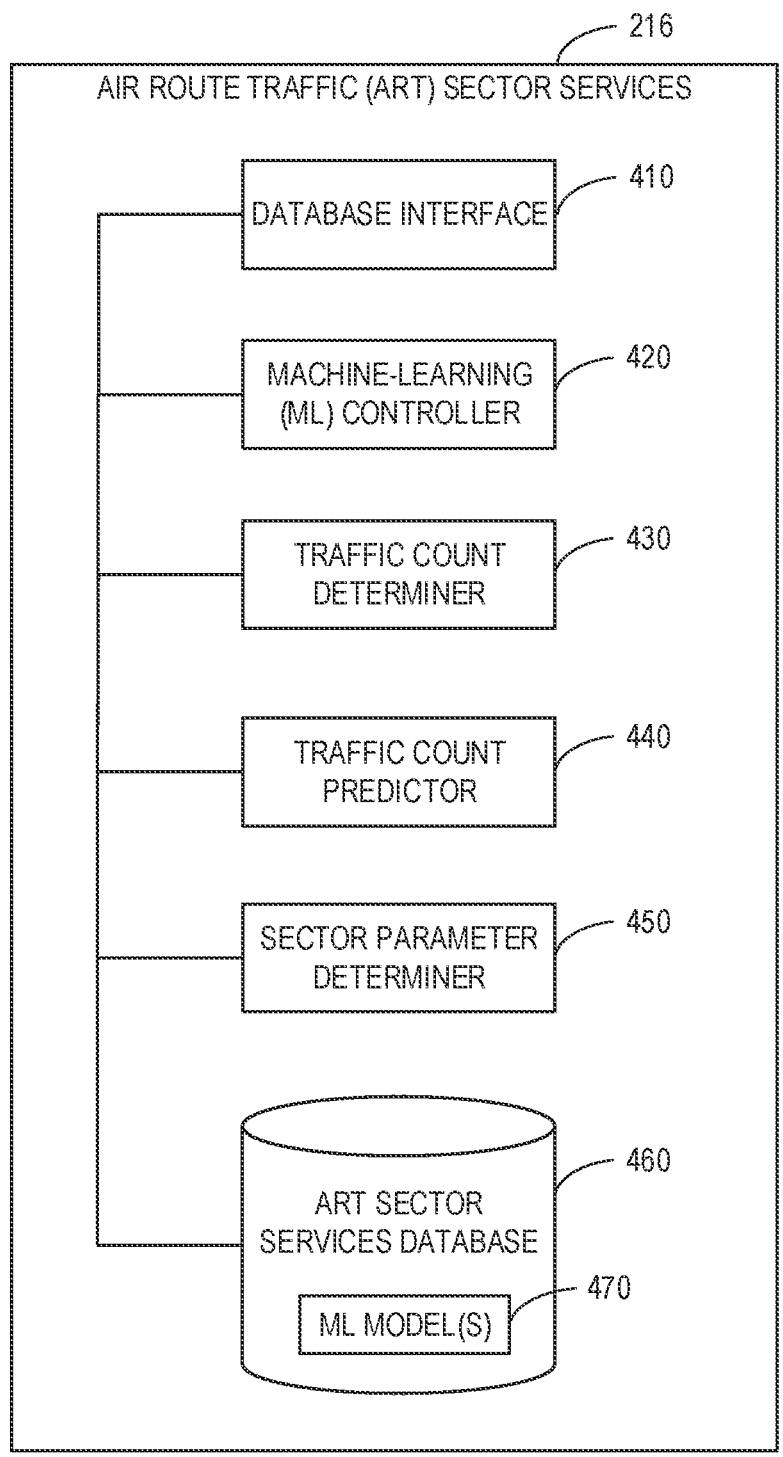
FIG. 4 is an example implementation of the ART sector services of FIG. 2.

FIG. 4 is an example implementation of the ART sector services 216 of FIG. 2. In some examples, the ART sector services 216 can correspond to services that, when executed, can execute a computing task using physical and/or virtual hardware resources. In some examples, the ART sector services 216 executes ML models to determine an accuracy of the ML models in determining traffic counts for sectors of interest for time periods that have already occurred. In some examples, the ART sector services 216 trains (e.g., iteratively trains based on new incoming ART data) one or more of the ML models to improve an accuracy of the one or more ML models to predict and/or otherwise determine traffic counts for sectors of interest for time periods that have not yet occurred. In the illustrated example of FIG. 4, the ART sector services 216 include representative services (e.g., microservices) such as an example database interface 410, an example ML controller 420, an example traffic count determiner 430, an example traffic count predictor 440, an example sector parameter determiner 450, and an example ART sector services database 460, which includes example ML model(s) 470.

In the illustrated example of FIG. 4, the ART sector services 216 includes the database interface 410 to facilitate queries to the second database 208 of FIG. 2. In some examples, the database interface 410 transmits a query to the second database 208 based on a request from the host application 224 of FIG. 2 for a traffic count for a sector of interest for a previous time period. In such examples, in response to the query, the database interface 410 can obtain a database entry, a database entry field of the database entry, etc., from the second database 208 corresponding to the traffic count.

In the illustrated example of FIG. 4, the ART sector services 216 includes the ML controller 420 to execute and/or train one or more ML models. In some examples, the ML controller 420 executes and/or trains one or more ML models including one or more regression ML models, one or more non-linear regression ML models, one or more ensemble regression ML models, one or more neural networks (e.g., a CNN, a DNN, a RNN, etc.), etc., and/or a combination thereof.

In some examples, the ML controller 420 executes and/or trains one or more ML models based on and/or otherwise using learning data (e.g., a learning data set), training data (e.g., a training data set), etc. In some examples, the ML controller 420 determines the learning data, the training data, etc., based on analyzing, evaluating, etc., sector information including traffic counts obtained from the second database 208. The ML controller 420 can obtain the traffic counts for sectors of interest for previous time periods and, thus, the traffic counts can correspond to known and/or otherwise previously determined traffic counts.

In some examples, the ML controller 420 can determine training data by pruning and/or otherwise removing outlier sector information from the sector information to be used for training data. For example, the ML controller 420 can select a time range of interest to process (e.g., the thirty-second bucket of the day representative of 8:00-8:15 AM Central Standard Time or any other time bucket). The ML controller 420 can determine a traffic count for each sector included in the sector information at the selected time range. For example, the ML controller 420 can determine a first traffic count for a first sector, a second traffic count for a second sector, etc., at the thirty-second bucket. In such examples, the first traffic count, the second traffic count, etc., are known traffic counts (e.g., historical traffic counts).

In some examples, the ML controller 420 determines a threshold value based on the traffic counts. For example, the ML controller 420 can determine an average, a median, etc., of the traffic counts and compare the traffic counts to the average, the median, etc. In such examples, the ML controller 420 can compare the traffic counts to the threshold value and determine whether to identify the sector information associated with the traffic counts as training data. For example, the ML controller 420 can identify first sector information associated with a first sector as training data, identify second sector information associated with a second sector as not training data, etc., based on the comparison. In such examples, the ML controller 420 can determine that a first traffic count of the first sector is not greater than the threshold value, a second traffic count of the second sector is greater than the threshold value, etc., based on the comparisons. Advantageously, the ML controller 420 can identify sector information that does not correspond to typical sector behavior (e.g., sector density behavior) and can reject, remove, and/or otherwise discard such sector information so as not to be included in training data for training one or more ML models.

In some examples, the ML controller 420 evaluates one or more ML models by using cross-validation (e.g., k-fold cross-validation, stratified k-fold cross validation, leave one out cross validation, etc.). For example, the ML controller 420 can train several ML models on subsets of available input data (e.g., the data included in the second database 208) and evaluate the ML models on the complementary subset of the data. The ML controller 420 can use cross-validation to detect overfitting (e.g., a failure to generalize a pattern).

In some examples, the ML controller 420 evaluates the ML models using k-fold cross-validation. For example, the ML controller 420 can split or divide the input data into k subsets of data or k groups (also known as folds). In such examples, the ML controller 420 can train the ML models on all but one (e.g., k−1) of the subsets, and then evaluate the ML models based on the subset that was not used for training. For example, the k−1 groups can be used as a training data set and the remaining group can be a test data set.

The ML controller 420 can repeat the evaluation process k times, with a different subset reserved for test or evaluation (and excluded from training) each time. The ML controller 420 can fit a model on the training set and evaluate the model on the test set to calculate and/or otherwise determine a score (e.g., a cross-validation score, an evaluation score, etc.). The ML controller 420 can determine a score for each of the ML models based on the cross-validation. In some examples, the ML controller 420 selects an ML model to train based on the ML model having the highest overall score of the ML models during all k runs, the highest average score of the ML models during all k runs, etc.

In some examples, the ML controller 420 identifies one or more ML models to train by evaluating an execution of the one or more ML models using historical or previously obtained ART data. In such examples, the ML controller 420 can train an identified ML model using the determined training data determined. In some examples, the ML controller 420 can identify an ML model to train by determining which of the ML models being evaluated generates a least amount of error when determining traffic counts based on historical ART data that includes known traffic counts.

For example, the ART data 222 of FIG. 2 can be associated with sectors having first traffic counts that are known for past time periods. The ML controller 420 can execute a plurality of ML models on the ART data 222 to generate traffic counts. The ML controller 420 can compare the generated traffic counts to the known traffic counts associated with the historical ART data. Based on the comparisons, the ML controller 420 can identify one of the ML models to train and subsequently execute to predict traffic counts for future time periods. For example, the ML controller 420 can identify a first ML model of the ML models in response to determining that the first ML model determine a traffic count that had the least amount of error when compared to traffic counts generated by different ML models. In some examples, the ML controller 420 can compile the identified ML model as one or more machine or computer-readable executable(s) and store the one or more machine or computer-readable executable(s) in the ART sector services database as the ML model(s) 470.

In the illustrated example of FIG. 4, the ART sector services 216 includes the traffic count determiner 430 to determine a traffic count for a sector during a time period based on the ART data 222 of FIG. 2. In some examples, the traffic count determiner 430 determines a traffic count for a sector based on historical ART data. For example, the traffic count determiner 430 can determine a traffic count for a time period that has already occurred based on the ART data 222 that has been processed and stored in the second database 208. In some examples, the traffic count determiner 430 determines a current or substantially instantaneous traffic count for a sector of interest. For example, the traffic count determiner 430 can determine a quantity of aircraft located and/or otherwise flying in a specified sector during the current or near-instant time period.

In the illustrated example of FIG. 4, the ART sector services 216 includes the traffic count predictor 440 to predict and/or otherwise determine a traffic count for a sector during a future time period. In some examples, the traffic count predictor 440 executes one of the ML model(s) 470 to determine a traffic count. For example, the traffic count predictor 440 can execute a trained RNN to determine a traffic count for a sector of interest for an upcoming time period of interest.

In the illustrated example of FIG. 4, the ART sector services 216 includes the sector parameter determiner 450 to calculate and/or otherwise determine statistics or other metrics associated with a sector of interest based on determined traffic counts. For example, the sector parameter determiner 450 can determine metrics including a mean, a mode, a range, etc., of traffic counts for one or more sectors. In other examples, the sector parameter determiner 450 can determine a trend based on the metrics and/or, more generally, the determined traffic counts. For example, the sector parameter determiner 450 can determine that a sector is becoming increasingly congested based on previous time periods. In other examples, the sector parameter determiner 450 can predict that a sector will be congested in one or more future time periods based on predicted traffic counts.

In some examples, the sector parameter determiner 450 configures and/or otherwise determines a threshold that can be used by the sector data generator 218 of FIG. 2. For example, the sector parameter determiner 450 can determine the threshold value for respective ones of sectors of interest for a future time period based on at least one of (1) first flight plans for the plurality of the aircraft 106A-F during the future time period, (2) weather information associated with the sectors of interest during the future time period, or (3) historical information including at least one of second flight plans or second weather information associated with the sectors during a previous time period, a historical time period, a time period before the future time period, etc. Advantageously, the sector parameter determiner 450 can dynamically adjust the threshold value for respective ones of the sectors of interest for future time periods based on information stored in the second database 208, traffic counts predicted by the ML model(s) 470, etc., and/or a combination thereof.

In the illustrated example of FIG. 4, the ART sector services 216 includes the ART sector services database 460 to record and/or otherwise store machine readable executables (e.g., the ML model(s) 470, learning data, training data, etc.). The ART sector services database 460 can be implemented by a volatile memory (e.g., a SDRAM, DRAM, RDRAM, etc.) and/or a non-volatile memory (e.g., flash memory). The ART sector services database 460 can additionally or alternatively be implemented by one or more DDR memories, such as DDR, DDR2, DDR3, DDR4, mDDR, etc. The ART sector services database 460 can additionally or alternatively be implemented by one or more mass storage devices such as hard disk drive(s), compact disk drive(s), digital versatile disk drive(s), solid-state disk drive(s), etc. While in the illustrated example the ART sector services database 460 is illustrated as a single database, the ART sector services database 460 can be implemented by any number and/or type(s) of databases. Furthermore, the machine readable executables in the ART sector services database 460 may be in any data format such as, for example, binary, comma delimited, hexadecimal, JSON, tab delimited, SQL, XML, etc.

In the illustrated example of 4, the ART sector services database 460 includes the ML model(s) 470 to determine traffic counts for requested sectors by the host application 224 of FIG. 2 and/or, more generally, the computing devices 226, 228, 230 of FIG. 2. In FIG. 4, the ML model(s) 470 can include one or more trained ML models. For example, the ML model(s) 470 can include and/or otherwise correspond to one or more trained regression ML models, one or more trained non-linear regression ML models, one or more trained ensemble regression ML models, one or more trained neural networks (e.g., a CNN, a DNN, a RNN, etc.), etc., and/or a combination thereof. In some examples, the ML model(s) 470 are stored as machine or computer-readable executable(s). For example, the ML model(s) 470 can be one or more binary files, one or more executables, etc.

While an example manner of implementing the ART sector services 216 of FIG. 2 is illustrated in FIG. 4, one or more of the elements, processes and/or devices illustrated in FIG. 4 may be combined, divided, re-arranged, omitted, eliminated and/or implemented in any other way. Further, the example database interface 410, the example ML controller 420, the example traffic count determiner 430, the example traffic count predictor 440, the example sector parameter determiner 450, the example ART sector services database 460, the example ML model(s) 470, and/or, more generally, the example ART sector services 216 of FIG. 2 may be implemented by hardware, software, firmware and/or any combination of hardware, software and/or firmware. Thus, for example, any of the example database interface 410, the example ML controller 420, the example traffic count determiner 430, the example traffic count predictor 440, the example sector parameter determiner 450, the example ART sector services database 460, the example ML model(s) 470, and/or, more generally, the example ART sector services 216 could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example database interface 410, the example ML controller 420, the example traffic count determiner 430, the example traffic count predictor 440, the example sector parameter determiner 450, the example ART sector services database 460, and/or the example ML model(s) 470 is/are hereby expressly defined to include a non-transitory computer readable storage device or storage disk such as a memory, a DVD, a CD, a Blu-ray disk, etc., including the software and/or firmware. Further still, the example ART sector services 216 of FIG. 2 may include one or more elements, processes and/or devices in addition to, or instead of, those illustrated in FIG. 4, and/or may include more than one of any or all of the illustrated elements, processes and devices.

FIG. 5 depicts an example database entry 500 generated by the database controller 204 of FIGS. 2 and/or 3. In FIG. 5 the database entry 500 can correspond to one of the database entries stored in the second database 208 of FIG. 2. In FIG. 5, the database entry 500 is representative of sector information associated with one sector for a time period of interest (e.g., a time bucket of 15 mins, one hour, one day, one week, etc.). For example, the database entry 500 can be representative of a first sector managed by the NAS for a 24-hour time period. In FIG. 5, the database entry 500 includes key fields including and/or otherwise representative of descriptions of stored data, value fields including and/or otherwise representative of stored data, and type fields including and/or otherwise representative of data types of the stored data. In FIG. 5, the database entry 500 is identified by a database identifier of "ZNYNC1" and the database entry 500 has a document data type. For example, the database entry 500 can be a document, a database document, etc.

In the illustrated example of FIG. 5, the database entry 500 includes at least seven example database entry fields 502, 504, 506, 508, 510, 512, 514 including a first example database entry field 502, a second example database entry field 504, a third example database entry field 506, a fourth example database entry field 508, a fifth example database entry field 510, a sixth example database entry field 512, and a seventh example database entry field 514. Alternatively, the database entry 500 may have fewer or more database entry fields than depicted in FIG. 5.

In the illustrated example of FIG. 5, the database entry 500 includes the first database entry field 502, which is depicted as "_id", to store a database identifier (e.g., a database entry identifier). In FIG. 5, the database identifier is representative of an example sector name (e.g., a flight sector name). Alternatively, the database identifier may be representative of a flight number, an aircraft type, etc. In FIG. 5, the first database entry field 502 has a string data type. In FIG. 5, the first database entry field 502 has a value of "ZNYNC1" representative of the database entry 500 corresponding to a sector identified as "ZNYNC1".

In the illustrated example of FIG. 5, the database entry 500 includes the second database entry field 504, which is depicted as "art:flightInList", to store a flight number array. In FIG. 5, the flight quantity array includes a plurality of elements, or aircraft flight numbers (e.g., a flight number of the first aircraft 106A, the second aircraft 106B, etc., of FIG. 1), of aircraft that have entered, exited, and/or otherwise crossed the sector associated with the database entry 500. In FIG. 5, the second database entry field 504 has an array data type. In FIG. 5, the second database entry 504 has a value of "2770" representative of 2770 elements, or 2770 different or unique flight numbers, that have either entered or exited the ZNYNC1 sector.

In the illustrated example of FIG. 5, the database entry 500 includes the third database entry field 506, which is depicted as "art:departureTimelist", to store a departure time array. In FIG. 5, the departure time array includes a plurality of elements, or departure times of aircraft (e.g., a departure time of the first aircraft 106A, the second aircraft 106B, etc., of FIG. 1), that have entered and/or exited the sector associated with the database entry 500. For example, the departure times can be in a Coordinated Universal Time (UTC) format. In FIG. 5, the third database entry field 506 has an array data type. In FIG. 5, the third database entry 506 has a value of "2770" representative of 2770 elements, or 2770 departure times, of aircraft that have either entered or exited the ZNYNC1 sector. In some examples, the departure times have a one-to-one (1:1) correspondence with an element in the second database entry field 504. For example, a first array element in the second database entry field 504 can correspond to a first array element in the third database entry field 506.

In the illustrated example of FIG. 5, the database entry 500 includes the fourth database entry field 508, which is depicted as "art:timeBuckets", to store a quantity of time buckets for a time period of interest. In FIG. 5, the fourth database entry field 508 includes a plurality of discretized time elements, or time buckets. In FIG. 5, the fourth database entry field 508 has an array data type. In FIG. 5, the third database entry 508 has a value of "1440" representative of 1440 time buckets. For example, the fourth database entry field 508 can be representative of a quantity of one-minute time buckets in a day (e.g., 1400 one-minute time buckets per day=(60 minutes per hour)×(24 hours per day)). In other examples, the fourth database entry field 508 can be representative of a different time bucket size, such as 5-minute time buckets, 15-minute time buckets, one-hour time buckets, etc.

In the illustrated example of FIG. 5, the database entry 500 includes the fifth database entry field 510, which is depicted as "art:dailyCount", to store a daily count value. In FIG. 5, the daily count value is representative of an example quantity of aircraft that have entered and/or exited the sector identified as "ZNYNC1" during a day, a 24-hour time period, etc. Alternatively, the daily count value may correspond to a different time period, such as an hour, a week, etc. In FIG. 5, the fifth database entry field 510 has an integer data type. In FIG. 5, the fifth database entry field 510 has a value of "2770" representative of a total of 2770 aircraft that have entered or exited the sector identified as "ZNYNC1".

In the illustrated example of FIG. 5, the database entry 500 includes the sixth database entry field 512, which is depicted as "art:version", to store a database entry version. In FIG. 5, the database entry version is representative of an iteration, a version, etc., of the database entry 500. In FIG. 5, the sixth database entry field 512 has an integer data type. In FIG. 5, the sixth database entry field 512 has a value of "3" representative of a third version of the database entry 500. For example, the database controller 204 can increment the version from "3" to "4" in response to updating the database entry 500 with new ART data. In such examples, the database controller 204 can increment the version in response to adding one or more elements to the second database entry field 504, the third database entry field 506, etc.

In the illustrated example of FIG. 5, the database entry 500 includes the seventh database entry field 514, which is depicted as "art:msgType", to store a message type. For example, the message type can be based on a type of the message(s) 223. In such examples, the message type can be based on a message type included in a header data field of the data field(s) 225. In FIG. 5, the message type is representative of a type of the database entry 500. For example, the message type can be a sector count (sectorCOUNT), a weather type, etc., representative of data associated with a sector of interest. In FIG. 5, the seventh database entry field 514 has a string data type. In FIG. 5, the seventh database entry field 514 has a value of "sectorCOUNT" representative of the database entry 500 corresponding to storing data associated with a sector count, a traffic count, etc., of a sector.

Figure 6:
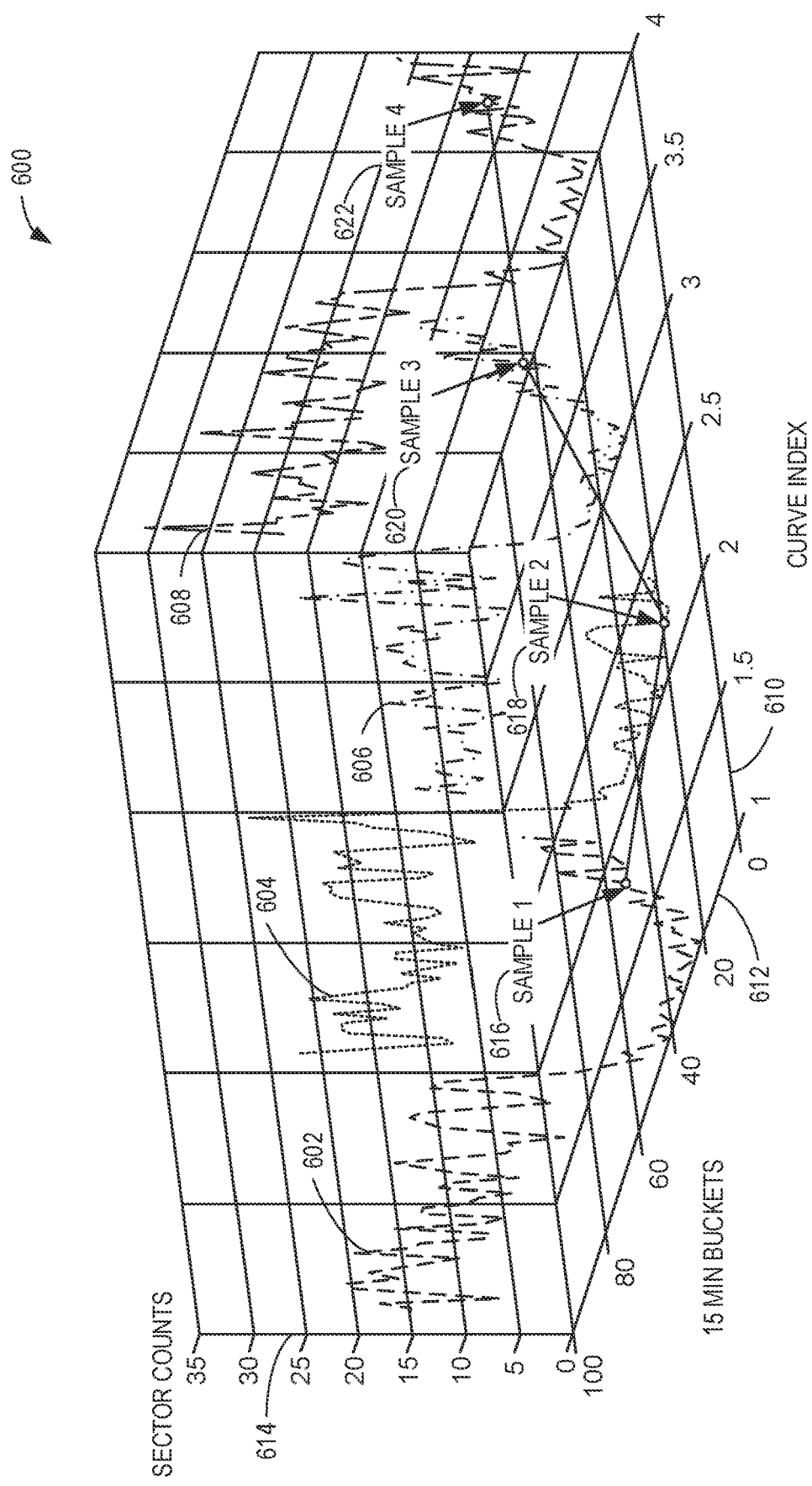
FIG. 6 depicts example ART sector curves as a function of bucket number and sector counts.

FIG. 6 depicts an example graph (e.g., a three-dimensional (3-D) graph corresponding to an orthogonal X-axis, Y-axis, and Z-axis representation) 600 including example ART sector curves 602, 604, 606, 608 as a function of bucket number and sector counts. In FIG. 6, the graph 600 has an X-axis 610 demarcating a curve index or a curve identifier. In FIG. 6, the graph 600 has a Y-axis 612 demarcating a 15 minute bucket number, or a quantity of buckets. In FIG. 6, each of the buckets are representative of a 15 minute time span, increment, range, etc. In FIG. 6, the graph 600 has a Z-axis 614 demarcating sector counts (e.g., a quantity of aircraft in a sector).

In the illustrated example of FIG. 6, the ART sector curves 602, 604, 606, 608 are based on the ART data 222 of FIG. 2. For example, the database controller 204 of FIG. 2 can store data included in the ART sector curves 602, 604, 606, 608 by extracting, processing, and analyzing the ART data 222. In some examples, the ML controller 420 of FIG. 4, and/or, more generally, the ART sector services 216 of FIG. 2, generates the ART sector curves 602, 604, 606, 608. For example, the ML controller 420 can generate the ART sector curves 602, 604, 606, 608 to identify a learning set to train one or more ML models.

In the illustrated example of FIG. 6, the ART sector curves 602, 604, 606, 608 include a first example ART sector curve 602 corresponding to curve index 1, a second example ART sector curve 604 corresponding to curve index 2, a third example ART sector curve 606 corresponding to curve index 3, and a fourth example ART sector curve 608 corresponding to curve index 4. Alternatively, the ML controller 420 may generate fewer or more ART sector curves than the ART sector curves 602, 604, 606, 608 depicted in FIG. 6.

In some examples, the ML controller 420, and/or, more generally, the ART sector services 216, selects training data for use by one or more ML models in response to identifying and removing outlier ART data. In FIG. 6, the ML controller 420 can identify outliers by determining whether one or more of the ART sector curves 602, 604, 606, 608 are representative of atypical ART data with respect to the other ART sector curves 602, 604, 606, 608.

In the illustrated example of FIG. 6, the ML controller 420, and/or, more generally, the ART sector services 216, identifies a time range of interest to process with respect to the ART sector curves 602, 604, 606, 608. In FIG. 6, the ML controller 420 identifies bucket 20 to process. In FIG. 6, the ML controller 420 determines a sector count for each of the ART sector curves 602, 604, 606, 608 at bucket 20. In FIG. 6, the ML controller 420 can identify a first example sector count (SAMPLE 1) 616 for the first ART sector curve 602, a second example sector count (SAMPLE 2) 618 for the second ART sector curve 604, a third example sector count (SAMPLE 3) 620 for the third ART sector curve 606, and a fourth example sector count (SAMPLE 4) 622 for the fourth ART sector curve 608. The ML controller 420 can determine whether to exclude and/or otherwise remove one or more of the ART sector curves 602, 604, 606, 608 from a learning set to train an ML model based on the determined sector counts 616, 618, 620, 622 as described below in connection with FIG. 7.

Figure 7:
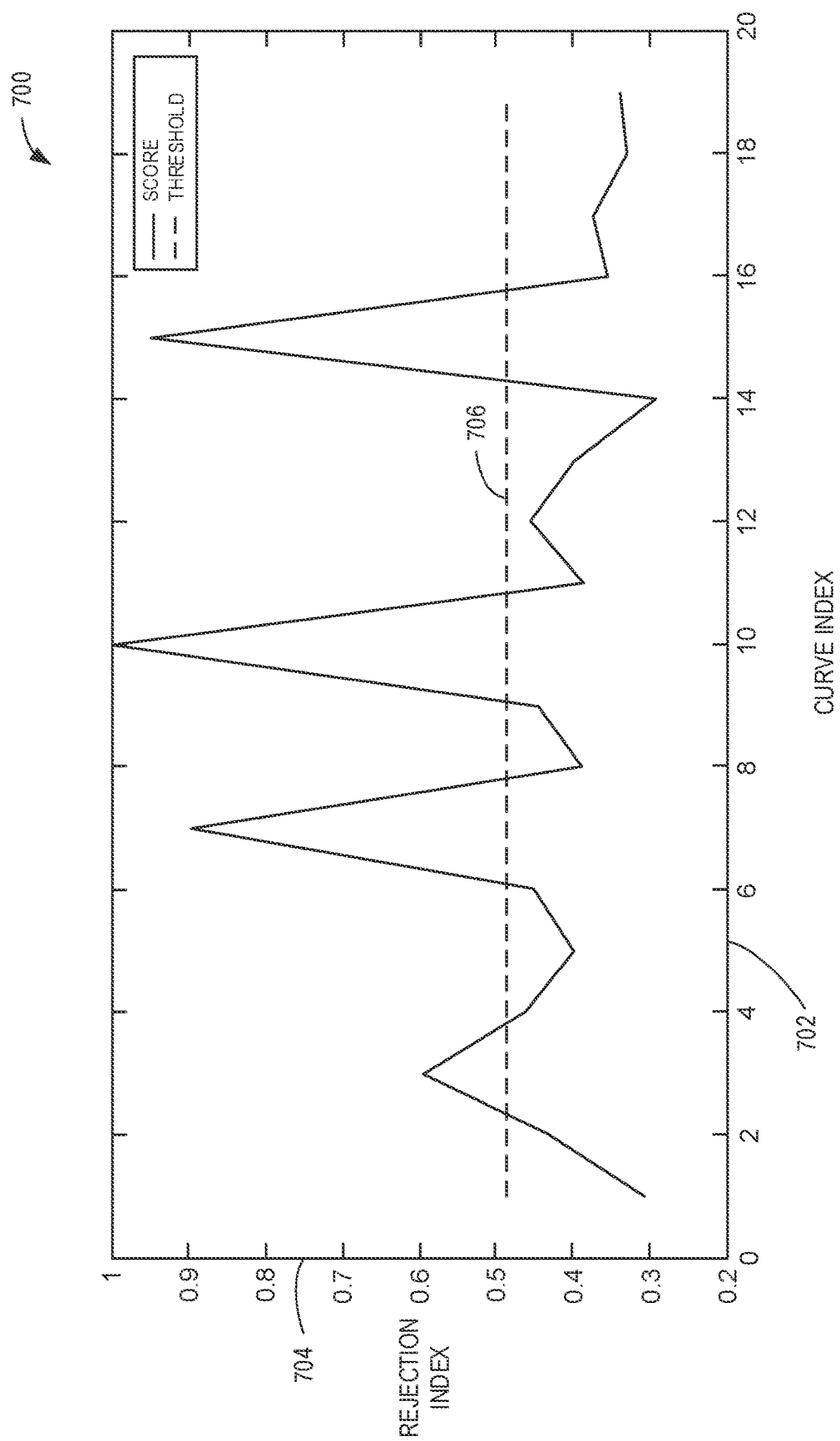
FIG. 7 depicts an example graph illustrating an outlier removal process by the ART sector services of FIGS. 2 and/or 4.

FIG. 7 depicts an example graph (e.g., a two-dimensional (2-D) graph corresponding to an orthogonal X-axis and Y-axis representation) 700 illustrating an example outlier removal process by the ML controller 420 of FIG. 4, and/or, more generally, the ART sector services 216 of FIGS. 2 and/or 4. In FIG. 7, the graph 700 has an X-axis 702 representative of a curve index or a curve identifier. For example, a first rejection index value at curve index 1 of FIG. 7 can correspond to a first normalized value of SAMPLE 1 of curve index 1 of FIG. 6, a second rejection index value at curve index 2 of FIG. 7 can correspond to a second normalized value of SAMPLE 2 of curve index 2 of FIG. 6, a third rejection index value at curve index 3 of FIG. 7 can correspond to a third normalized value of SAMPLE 3 of curve index 3 of FIG. 6, a fourth rejection index value at curve index 4 of FIG. 7 can correspond to a fourth normalized value of SAMPLE 4 of curve index 4 of FIG. 6, etc. In FIG. 7, the graph 700 has a Y-axis 704 representative of a rejection index.

In the illustrated example of FIG. 7, the rejection index corresponds to a parameter, a metric, etc., indicative of atypical or outlier ART data. In FIG. 7, the rejection index is based on normalized values of absolute error values of the ART sector curves 602, 604, 606, 608 at a time range of interest. For example, the ML controller 420 of FIG. 4 can determine the average value of a plurality of sector counts at bucket 20 of the graph 600 of FIG. 6, where the plurality of sector counts include the first through fourth sector counts 616, 618, 620, 622 of FIG. 6. The ML controller 420 can determine an example threshold value (e.g., a rejection threshold value, an ART rejection threshold, an ART curve rejection threshold, etc.) 706 represented by a horizontal dashed line in FIG. 7. The ML controller 420 can determine the threshold value by normalizing an average or mean value of the plurality of the sector counts in a range of 0 to 1. In FIG. 7, the ML controller 420 determines the threshold value to be 0.5 by normalizing the average value of the plurality of the sector counts to be 0.5.

In the illustrated example of FIG. 7, the ML controller 420 can determine a score for each of the curve indices based on a corresponding absolute error difference. In FIG. 7, the ML controller 420 can determine an absolute error difference for a sector between (1) a sector count for the sector and (2) the average value of the plurality of the sector counts. In FIG. 7, the ML controller 420 can normalize the absolute error difference in a range of 0 to 1.0 for each of the curve indices.

In the illustrated example of FIG. 7, the ML controller 420 can identify a curve index as being associated with outlier ART data based on the scores. In FIG. 7, the ML controller 420 can identify a curve index to not be included in a learning set when the curve index has a score above the threshold value. In FIG. 7, the ML controller 420 can identify a curve index to be included in the learning set when the curve index has a score below the threshold value. For example, the ML controller 420 can determine that curve indices 3, 7, 10, and 15 above sector counts above the threshold value. In such examples, the ML controller 420 can determine that the third ART sector curve 606 of FIG. 6 represents atypical, abnormal, outlier, etc., data and is not to be included in a learning set to train an ML model. Advantageously, the ML controller 420 can identify ART data associated with the curve indices 1, 2, 4-6, 8, 9, 11-14, and 16-20 to be included in the learning set.

Figure 8B:
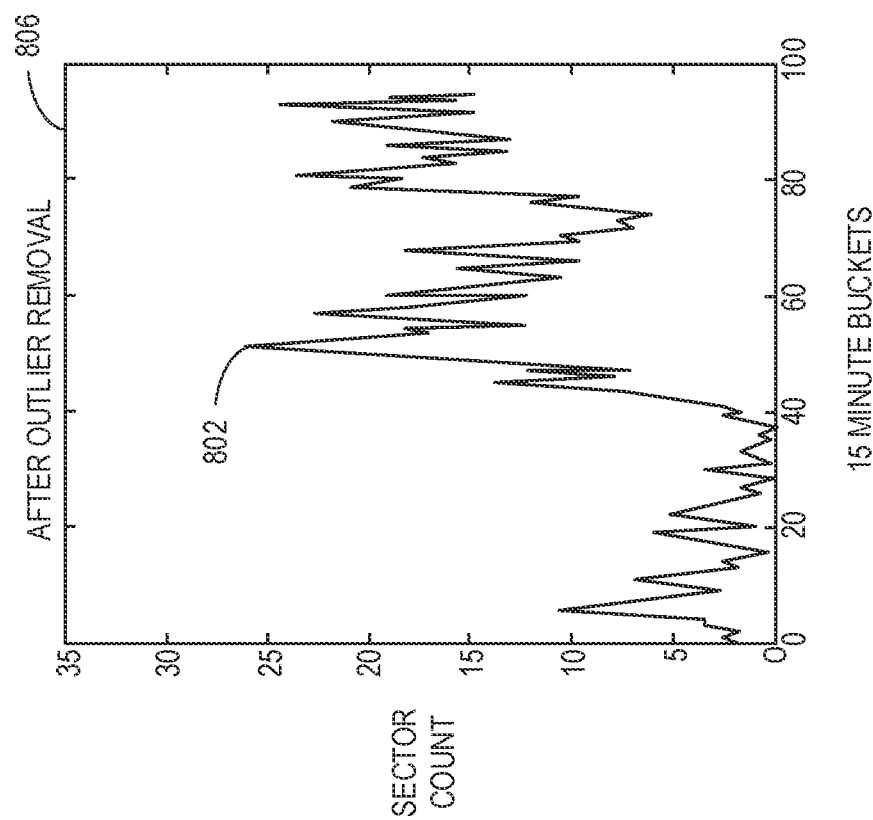
FIG. 8B depicts one of the example ART sector curves of FIG. 8A after the example outlier removal operation by the ART sector services of FIGS. 2 and/or 4.
Figure 8A:
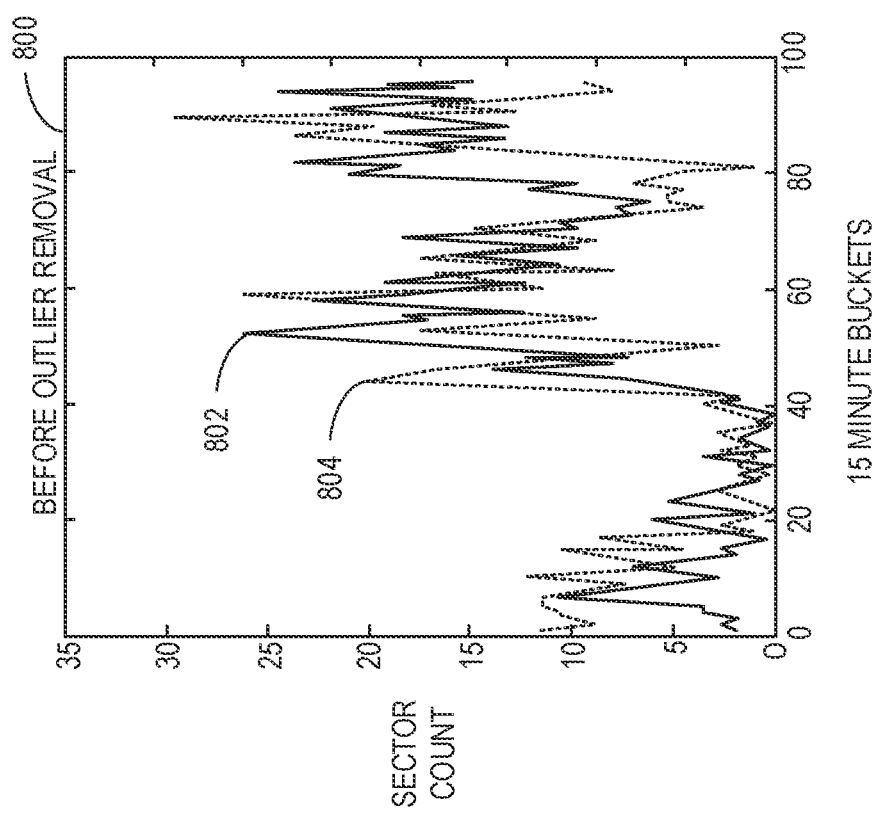
FIG. 8A depicts example ART sector curves prior to an example outlier removal operation by the ART sector services of FIGS. 2 and/or 4.

FIG. 8A depicts a first example graph 800 including example ART sector curves 802, 804 prior to an example outlier removal operation by the ML controller 420 of FIG. 4 and/or, more generally, the ART sector services 216 of FIGS. 2 and/or 4. In FIG. 8A, the ART sector curves 802, 804 are representative of sector counts as a function of bucket number. In FIG. 8A, the first graph 800 includes the ART sector curves 802, 804 including a first example ART sector curve 802 and a second example ART sector curve 804. In FIG. 8A. the first ART sector curve 802 can correspond to curve index 1 of FIGS. 6 and/or 7. In FIG. 8A, the second ART sector curve 804 can correspond to curve index 3 of FIGS. 6 and/or 7.

In the illustrated example of FIG. 8A, the ML controller 420 can determine that the second ART sector curve 804 includes outlier data and/or otherwise includes data that is atypical, abnormal, etc., with respect to other ART data (e.g., the first ART sector curve 802). In some examples, the ML controller 420 can identify the first ART sector curve 802 to be included in a learning set to train an ML model. In some examples, the ML controller 420 can execute an outlier removal operation by identifying the second ART sector curve 804 as not be included in the learning set. In such examples, the ML controller 420 can discard the second ART sector curve 804, annotate and/or otherwise identify the data associated with the second ART sector curve 804 as not to be used for learning data, instruct and/or otherwise invoke the database controller 204 of FIG. 2 to remove data associated with the second ART sector curve 804 from the second database 208 of FIG. 2, etc., and/or a combination thereof.

FIG. 8B depicts a second example graph 806 including the first ART sector curve 802 of FIG. 8A after the outlier removal operation by the ML controller 420 of FIG. 4 and/or, more generally, the ART sector services 216 of FIGS. 2 and/or 4. For example, the second graph 806 can be representative of the ML controller 420 identifying the first ART sector curve 802 as learning data while not identifying the second ART sector curve 804 as learning data. Additionally or alternatively, in some examples, the ML controller 420 can execute the outlier removal operation for a plurality of ART sector curves including the first and second ART sector curves 802, 804.

Figure 9:
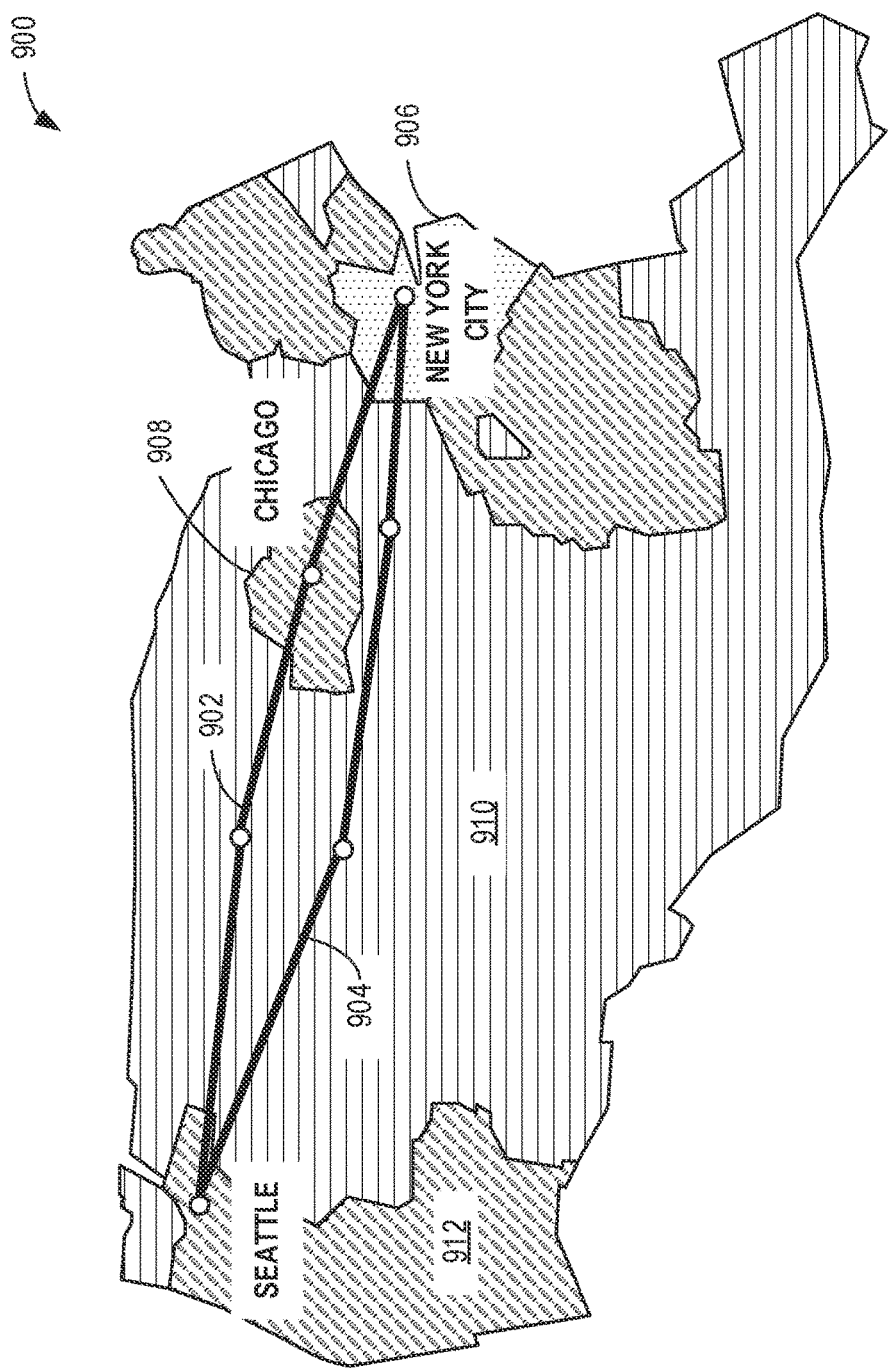
FIG. 9 is a schematic illustration of adjusting a flight plan of an aircraft based on the examples disclosed herein.

FIG. 9 is a schematic illustration of adjusting a first example flight plan (e.g., a first flight path) 902 of an aircraft to a second example flight plan (e.g., a second flight path)

904 in an example air traffic management (ATM) environment 900. In FIG. 9, the ATM environment 900 can be airspace managed by the NAS. In FIG. 9, the ATM environment 900 includes a plurality of example sectors 906, 908, 910, 912. The sectors 906, 908, 910, 912 are merely exemplary to describe the examples disclosed herein and are not to scale. For example, the ATM environment 900 can include fewer or more sectors than the sectors 906, 908, 910, 912 depicted in FIG. 9. For example, an ATM environment managed by the NAS can include over one-thousand sectors.

In the illustrated example of FIG. 9, the sectors 906, 908, 910, 912 include a first example sector 906, a second example sector 908, a third example sector 910, and a fourth example sector 912. In FIG. 9, the first sector 906 includes New York City, the second sector 908 includes Chicago, and the fourth sector 912 includes Seattle. In FIG. 9, the first sector 906 has a first traffic density corresponding to a first quantity of aircraft during a time period, the second sector 908 has a second traffic density corresponding to a second quantity of aircraft during the time period, the third sector 910 has a third traffic density corresponding to a third quantity of aircraft during the time period, and the fourth sector 912 has the second traffic density corresponding to a fourth quantity of aircraft during the time period. In FIG. 9, the first quantity of aircraft is the greatest, which is followed by the second and fourth quantities of aircraft, which is followed by the third quantity of aircraft. In FIG. 9, the second and the fourth quantities of aircraft are substantially similar to each other (e.g., within a tolerance range of 1-10 aircraft). Accordingly, in FIG. 9, the first sector 906 is the most congested sector and the third sector 910 is the least congested sector, with the second and fourth sectors 908, 912 having an average level of congestion between the congestion levels of the first sector 906 and the third sector 910. In such examples, congestion is based on the quantity of aircraft in a sector during a time period.

In the illustrated example of FIG. 9, the first flight plan 902 is representative of an aircraft (e.g., the aircraft 106A-F of FIG. 1) departing from New York City in the first sector 906, flying through the second and third sectors 908, 910, and arriving in Seattle in the fourth sector 912. In FIG. 9, second flight plan 904 is representative of the aircraft departing from New York City in the first sector 906, flying through the third sector 910, and arriving in Seattle in the fourth sector 912. In FIG. 9, the second flight plan 904 avoids flying through the congestion of the second sector 908.

In some examples, the second computing system(s) 114 queries the ART prediction system 104 of FIG. 1 to predict and/or otherwise determine traffic counts for the first through fourth sectors 906, 908, 910, 912 during a time period in which the aircraft is expected to be flying through them. For example, the query controller 214 of FIG. 2 can invoke the ART sector services 216 of FIG. 2 to execute a trained one of the ML model(s) 470 to determine the traffic counts for upcoming time periods for the first through fourth sectors 906, 908, 910, 912. In such examples, the sector data generator 218 of FIG. 2 can package, aggregate, and/or otherwise compile the traffic counts in a data format (e.g., a compatible data format for the second computing system(s) 114 to be transmitted to the second computing system(s) 114.

In some examples, in response to obtaining the traffic counts from the ART prediction system 104, the second computing system(s) 114 can adjust the first flight plan 902 to the second flight plan 904 prior to a departure of the aircraft from New York City. For example, the second computing system(s) 114 can determine that the aircraft can avoid a congested sector like the second sector 908 by flying around the second sector 908 via the third sector 910. In such examples, the second computing system(s) 114 can instruct the aircraft to execute the second flight plan 904 prior to taking off from New York City.

In some examples, in response to obtaining the traffic counts from the ART prediction system 104, the second computing system(s) 114 can adjust the first flight plan 902 to the second flight plan 904 after the departure of the aircraft from New York City. For example, the aircraft can be in the first sector 906 after takeoff. In such examples, the second computing system(s) 114 can determine that the aircraft can avoid a congested sector like the second sector 908 by flying around the second sector 908 via the third sector 910. In such examples, the second computing system(s) 114 can instruct the aircraft to adjust from the first flight plan 902 to the second flight plan 904 after taking off from New York City. Advantageously, the ART prediction system 104 can reduce congestion in a sector by redirecting an aircraft having a flight plan including the congested sector to a less congested sector either prior to the aircraft taking off or while the aircraft is in flight.

Flowcharts and/or source code representative of example hardware logic, machine readable instructions, hardware implemented state machines, and/or any combination thereof for implementing the ART prediction system 104 of FIGS. 1 and/or 2 are shown in FIGS. 10-18. The machine readable instructions may be one or more executable programs or portion(s) of an executable program for execution by a computer processor such as the processor 1912 shown in the example processor platform 1900 discussed below in connection with FIG. 19. The program may be embodied in software stored on a non-transitory computer readable storage medium such as a CD-ROM, a floppy disk, a hard drive, a DVD, a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowcharts and/or the source code illustrated in FIGS. 10-18, many other methods of implementing the example ART prediction system 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), SQL, Swift, etc.

As mentioned above, the example processes of FIGS. 10-18 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 10 depicts example source code 1000 representative of example computer readable instructions that can be executed by the ART sector services 216 of FIGS. 2 and/or 4 to determine a traffic count for a sector of interest. In some examples, the source code 1000 is representative of services (e.g., microservices) that, when executed, can invoke the ML model(s) 470 of FIG. 4 to determine a traffic count, a predicted traffic count, etc., for one or more sectors of interest.

For example, the traffic count determiner 430 of FIG. 4, and/or, more generally, the ART sector services 216, can execute the service "getOneSectorCount" and, when executed, can determine a sector count for one sector during a time period spanning one or more days based on the ART data 222 included in the second database 208 of FIG. 2. In other examples, the traffic count predictor 440 of FIG. 4, and/or, more generally, the ART sector services 216, can execute the service "predictSectorCountWeekDay" and, when executed, can invoke the ML model(s) 470 can invoke the ML model(s) 470 to determine a sector count for one or more sectors during a time period spanning one day (e.g., a twenty-four (24) hour time period). In yet other examples, the sector parameter determiner 450 of FIG. 4, and/or, more generally, the ART sector services 216, can execute the service "getMeanPastDailySectorCountAllDays" and, when executed, can determine a mean, an average, etc., daily sector count for one sector for one or more past continuous days. Additionally or alternatively, the traffic count determiner 430, the traffic count predictor 440, the sector parameter determiner 450, and/or, more generally, the ART sector services 216, can execute the services included and/or otherwise associated with the source code 1000 of FIG. 10 to generate sector count related data for one or more sectors of interest.

Figure 11:
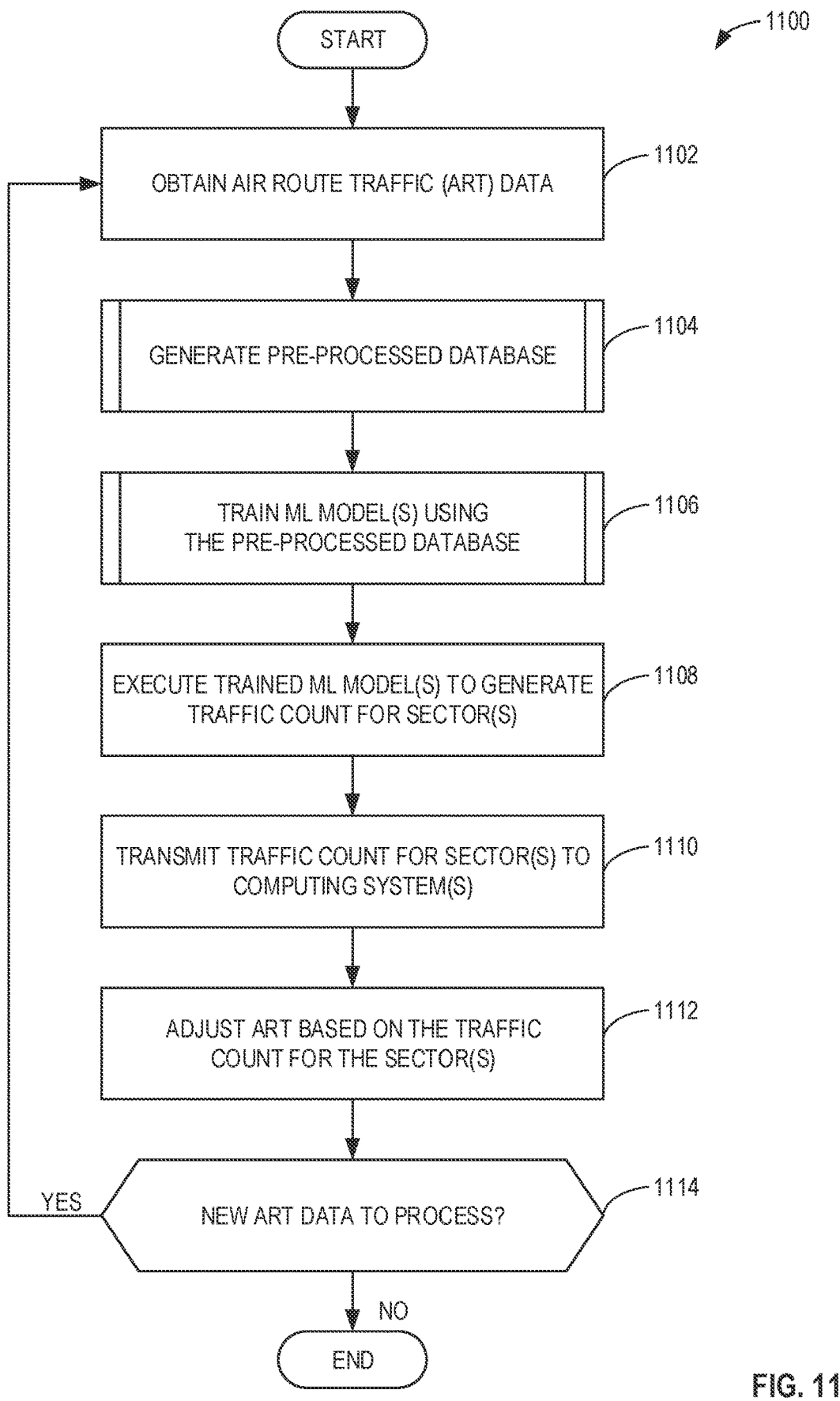
FIG. 11 is a flowchart representative of example machine readable instructions that may be executed to implement the ART prediction system of FIGS. 1 and/or 2 to determine traffic counts for air route traffic sectors.

FIG. 11 is a flowchart representative of example machine readable instructions 1100 that may be executed to implement the ART prediction system 104 of FIGS. 1 and/or 2 to determine traffic counts for air route traffic sectors. The machine readable instructions 1100 of FIG. 11 begin at block 1102, at which the ART prediction system 104 obtains ART data. For example, the first network interface 202 (FIG. 2) can obtain the ART data 222 from the first network 110. In such examples, the first network interface 202 can obtain ART data associated with one or more of the aircraft 106A-F (FIG. 1) such as flight numbers and/or corresponding arrival and/or departure airports, aircraft air speeds, aircraft altitudes, aircraft positions, aircraft waypoint information (e.g., a previous, current or instant, or future waypoint of an aircraft), airspace sector information (e.g., a previous, current or instant, or future sector of an aircraft), etc., and/or a combination thereof.

At block 1104, the ART prediction system 104 generates a pre-processed database. For example, the database controller 204 (FIG. 2) can inspect, discard, parse, and/or store portion(s) or an entirety of a FIXM message (e.g., one of the message(s) 223) included in the ART data 222 based on one or more rules. In such examples, the database controller 204 can generate the first database 206 (FIG. 2) and the second database 208 (FIG. 2) based on the ART data 222. An example process that may be executed to implement block 1104 is described below in connection with FIG. 12.

At block 1106, the ART prediction system 104 trains ML model(s) using the pre-processed database. For example, the ML controller 420 (FIG. 4), and/or, more generally, the ART sector services 216 (FIG. 2), can train a RNN using data stored in the second database 208. In such examples, the ML controller 420 can store the trained ML model as the ML model(s) 470 (FIG. 4) included in the ART sector services database 460 (FIG. 4). An example process that may be executed to implement block 1106 is described below in connection with FIG. 14.

At block 1108, the ART prediction system 104 executes trained ML model(s) to generate traffic count for sector(s). For example, the ML controller 420, and/or, more generally, the ART sector services 216, can execute the trained ML model(s) 470 to generate a traffic count during a time period of interest for at least one of the first sector 906, the second sector 908, the third sector 910, or the fourth sector 912 of FIG. 9.

At block 1110, the ART prediction system 104 transmits the traffic count for the sector(s) to computing system(s). For example, the second network interface 212 can transmit the traffic counts for at least one of the first sector 906, the second sector 908, the third sector 910, or the fourth sector 912 to one or more of the second computing system(s) 114 of FIG. 1, one or more of the computing devices 226, 228, 230 of FIG. 2, etc., and/or a combination thereof.

At block 1112, the ART prediction system 104 causes an adjustment of air route traffic based on the traffic count for the sector(s). For example, in response to the second network interface 212 transmitting the traffic counts for at least one of the first sector 906, the second sector 908, the third sector 910, or the fourth sector 912, one or more of the second computing system(s) 114 of FIG. 1, one or more of the computing devices 226, 228, 230 of FIG. 2, etc., can direct, instruct, and/or otherwise invoke an aircraft (e.g., one of the aircraft 106A-F of FIG. 1) to adjust flight plans. In such examples, one or more of the second computing system(s) 114 of FIG. 1, one or more of the computing devices 226, 228, 230 of FIG. 2, etc., can invoke the aircraft to transition from the first flight plan 902 of FIG. 9 to the second flight plan 904 of FIG. 9. In some examples, the aircraft transitions to the second flight plan 904 prior to taking off from a departure airport. In some examples, the aircraft transitions to the second flight plan 904 while in flight and/or is otherwise executing the first flight plan 902.

At block 1114, the ART prediction system 104 determines whether there is new ART data to process. For example, the database controller 204 can determine whether there is ART data not yet processed that can be retrieved from the first network 110, via the first network 110, etc. If, at block 1114, the ART prediction system 104 determines that there is new ART data to process, control returns to block 1102 to obtain the new ART data, otherwise the machine readable instructions 1100 of FIG. 11 conclude.

Figure 12:
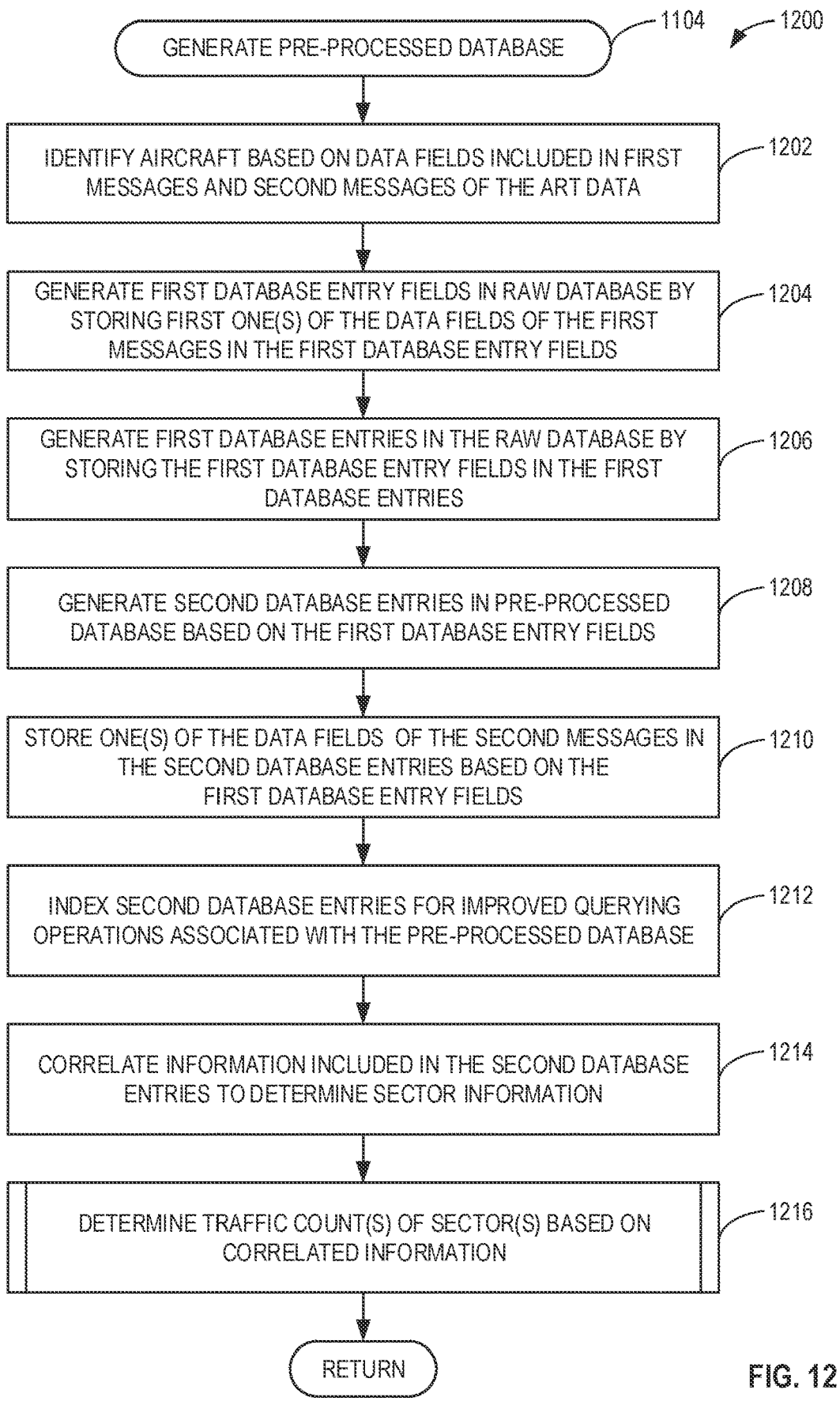
FIG. 12 is a flowchart representative of example machine readable instructions that may be executed to implement the database controller of FIGS. 2 and/or 3, and/or, more generally, the ART prediction system of FIGS. 1 and/or 2, to generate an example pre-processed database.

FIG. 12 is a flowchart representative of example machine readable instructions 1200 that may be executed to implement the database controller 204 of FIGS. 2 and/or 3, and/or, more generally, the ART prediction system 104 of FIGS. 1 and/or 2, to generate a pre-processed database. The machine readable instructions 1200 of FIG. 12 can be executed to implement block 1104 of FIG. 11. The machine readable instructions 1200 of FIG. 12 begin at block 1202, at which the database controller 204 identifies aircraft based on data fields included in first messages and second messages of the ART data. For example, the ART data 222 (FIG. 2) can include a first message and a second message of the messages 223 (FIG. 2), where the first message includes a first data field that includes a flight number of the second aircraft 106B of FIG. 1. In examples, the data extractor 310 (FIG. 3) can identify the second aircraft 106B based on the first data field.

At block 1204, the database controller 204 generates first database entry fields in a raw database by storing first one(s) of the data fields of the first messages in the first database entry fields. For example, the index generator 320 (FIG. 3) can generate one or more of the database entry fields 502, 504, 506, 508, 510, 512, 514 (FIG. 5) by storing one(s) of the data field(s) 225 (FIG. 2) of the message(s) 223 (FIG. 2) in the one or more database entry fields 502, 504, 506, 508, 510, 512, 514.

At block 1206, the database controller 204 generates first database entries in the raw database by storing the first database entry fields in the first database entries. For example, the index generator 320 can generate the database entry 500 (FIG. 5) by storing one or more of the database entry fields 502, 504, 506, 508, 510, 512, 514 in the database entry 500.

At block 1208, the database controller 204 generates second database entries in a pre-processed database based on the first database entry fields. For example, the index generator 320 can generate second database entries in the second database 208 (FIG. 2) that each include a database entry field such as a flight number, a message type, etc. For example, the index generator 320 can generate the database entry 500 (FIG. 5) having the first database entry field 502 (FIG. 5) and store the database entry 500 in the second database 208.

At block 1210, the database controller 204 stores one(s) of the data fields of the second messages in the second database entries based on the first database entry fields. For example, the data mapper 330 (FIG. 3) can identify a first set of one or more of the first database entries in the first database 206 that include a first flight number, a first message type, etc. In such examples, the data mapper 330 can identify a second set of one or more of the second database entries in the second database 208 that include the first flight number, the first message type, etc. The data mapper 330 can map the first set to the second set based on the identifications. The data mapper 330 can populate the second set with data or information included in and/or associated with the first set. For example, the data mapper 330 can populate the database entry 500 with data stored in the database entry fields of a mapped one of the first database entries.

At block 1212, the database controller 204 indexes the second database entries for improved querying operations associated with the pre-processed database. For example, the index generator 320 can execute one or more data structuring, data ordering, etc., operations on the second database 208 to reduce latency and/or improve query processing speeds.

At block 1214, the database controller 204 correlates information included in the second database entries to determine sector information. For example, the data correlator 340 (FIG. 3) can correlate and/or otherwise associate an arrival airport, a departure airport, an aircraft type, an airline, etc., within the second database entries with one or more sectors. In such examples, the data correlator 340 can determine one or more sectors that a flight number has previously flown in, is currently flying in, or will fly in the future. For example, the data correlator 340 can determine that a database entry in the second database 208 is associated with at least one of (1) the first sector 906 of FIG. 9 based on the database entry including a departure airport of New York City, (2) the second sector 908 of FIG. 9 based on the database entry including a first waypoint in the second sector 908, (3) the third sector 910 of FIG. 9 based on the database entry including a second waypoint in the third sector 910, or (4) the fourth sector 912 of FIG. 9 based on the database entry including an arrival airport of Seattle.

At block 1216, the database controller 204 determines traffic count(s) of sector(s) based on the correlated information. For example, the traffic count generator 350 can determine a traffic count for one or more previous time periods for at least one of the first sector 906, the second sector 908, the third sector 910, or the fourth sector 912 of FIG. 9 based on the correlated information. An example process that may be executed to implement block 1216 is described below in connection with FIG. 13. In response to determining the traffic count(s) of the sector(s) based on the correlated information at block 1216, control returns to block 1106 of the machine readable instructions 1100 of FIG. 11 to select ML model(s) to train using the pre-processed database.

Figure 13:
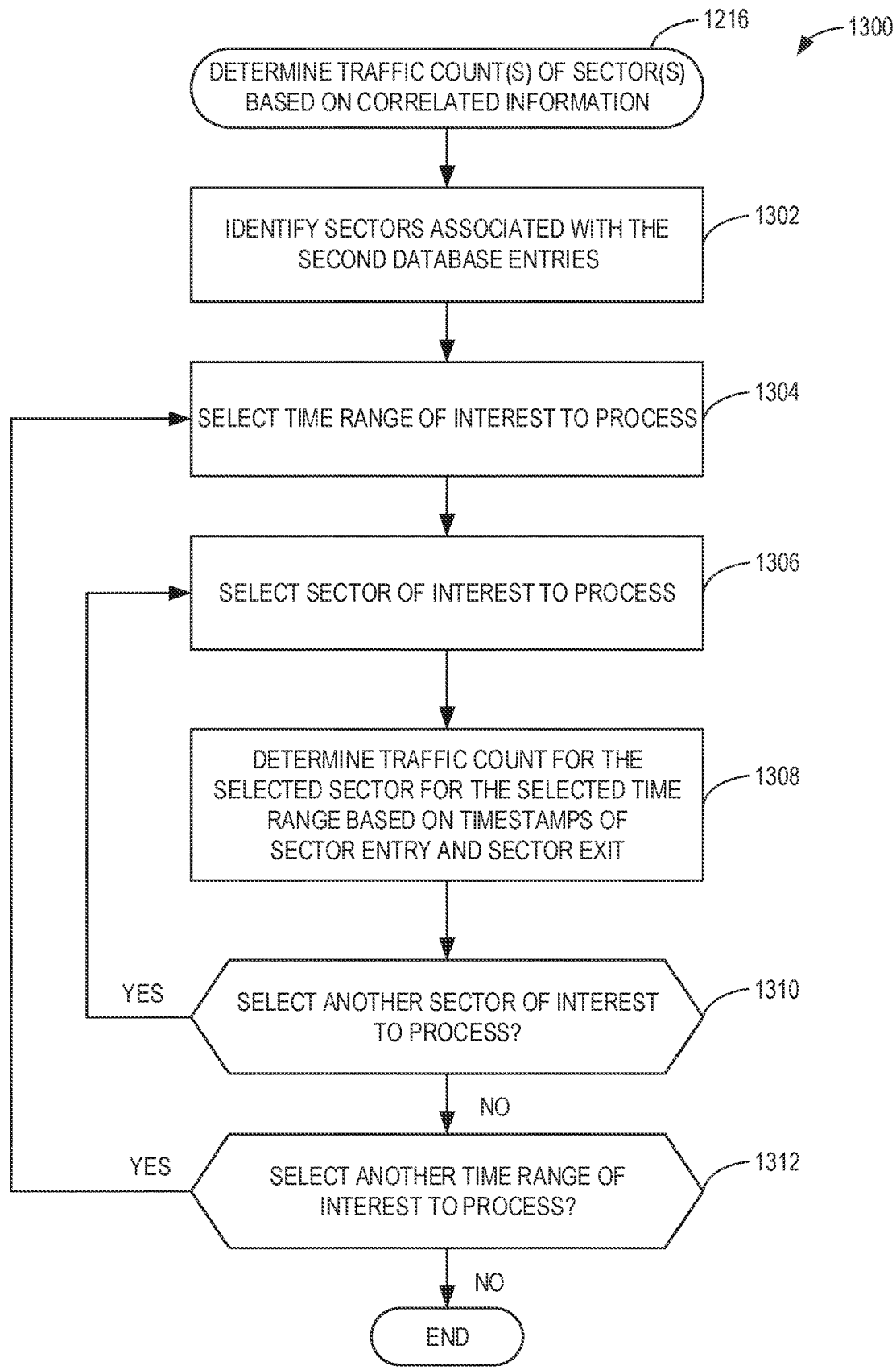
FIG. 13 is a flowchart representative of example machine readable instructions that may be executed to implement the database controller of FIGS. 2 and/or 3, and/or, more generally, the ART prediction system of FIGS. 1 and/or 2, to determine traffic counts of air route traffic sectors based on correlated information.

FIG. 13 is a flowchart representative of example machine readable instructions 1300 that may be executed to implement the database controller 204 of FIGS. 2 and/or 3, and/or, more generally, the ART prediction system 104 of FIGS. 1 and/or 2, to determine traffic count(s) of sector(s) based on correlated information. The machine readable instructions 1300 of FIG. 13 can be executed to implement block 1216 of FIG. 12. The machine readable instructions 1300 of FIG. 13 begin at block 1302, at which the database controller 204 identifies sectors associated with the second database entries. For example, the traffic count generator 350 (FIG. 3) can determine that the second database entries included in the second database 208 (FIG. 2) are associated with the first through the fourth sectors 906, 908, 910, 912 of FIG. 9.

At block 1304, the database controller 204 selects a time range of interest to process. For example, the traffic count generator 350 can select a first time bucket to process. At block 1306, the database controller 204 selects a sector of interest to process. For example, the traffic count generator 350 can select the first sector 906 of FIG. 9 to process.

At block 1308, the database controller 204 determines a traffic count for the selected sector for the selected time range based on timestamps of sector entry and exit. For example, the traffic count generator 350 can determine a quantity of aircraft (e.g., the aircraft 106A-F of FIG. 1) in the first sector 906 during the first bucket.

At block 1310, the database controller 204 determines whether to select another sector of interest to process. For example, the traffic count generator 350 can determine to select the second sector 908 of FIG. 9 to process. In other examples, the traffic count generator 350 can determine that all sectors of interest have been processed.

If, at block 1310, the database controller 204 determines to select another sector of interest to process, control returns to block 1306 to select another sector of interest of process. If, at block 1310, the database controller 204 determines not to select another sector of interest to process, then, at block 1312, the database controller 204 determines whether to select another time range of interest to process. For example, the traffic count generator 350 can determine to select a second time bucket to process. In other examples, the traffic count generator 350 can determine that all time buckets of interest have been processed.

If, at block 1312, the database controller 204 determines to select another time range of interest to process, control returns to block 1304 to select another time range of interest of process. If, at block 1312, the database controller 204 determines not to select another time range of interest to process, control returns to block 1106 of the machine readable instructions 1100 of FIG. 11 to select ML model(s) to train using the pre-processed database.

Figure 14:
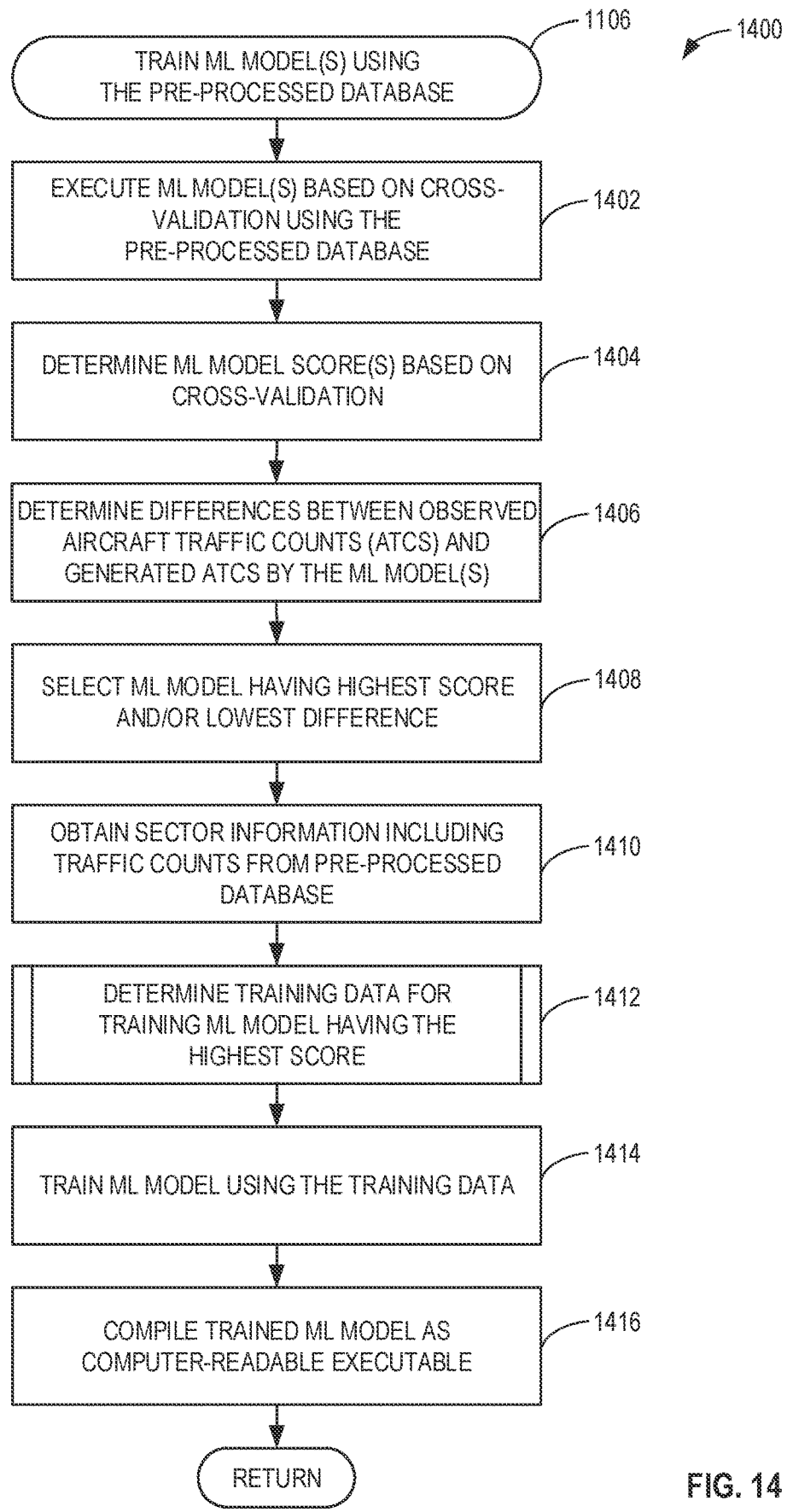
FIG. 14 is a flowchart representative of example machine readable instructions that may be executed to implement the ART sector services of FIGS. 2 and/or 4, and/or, more generally, the ART prediction system of FIGS. 1 and/or 2, to select machine-learning model(s) to train using an example pre-processed database.

FIG. 14 is a flowchart representative of example machine readable instructions 1400 that may be executed to implement the ART sector services 216 of FIGS. 2 and/or 4, and/or, more generally, the ART prediction system 104 of FIGS. 1 and/or 2, to select ML model(s) to train using a pre-processed database. The machine readable instructions 1400 of FIG. 14 can be executed to implement block 1106 of FIG. 14.

The machine readable instructions 1400 of FIG. 14 begin at block 1402, at which the ART sector services 216 execute ML model(s) based on cross-validation using the pre-processed database. For example, the ML controller 420 (FIG. 4) can perform and/or otherwise execute a cross-validation operation on a plurality of ML models including a first ML model (e.g., a regression model), a second ML model (e.g., an RNN), etc. In such examples, the ML controller 420 can execute the plurality of the ML models in response to executing the cross-validation operation.

At block 1404, the ART sector services 216 determines ML model score(s) based on the cross-validation. For example, the ML controller 420 can determine a cross-validation score for the first ML model, the second ML model, etc.

At block 1406, the ART sector services 216 determines differences between observed aircraft traffic counts (ATCSs) and generated ATCs by the ML model(s). For example, the ML controller 420 can determine differences between first aircraft traffic counts and second aircraft traffic counts. The first aircraft traffic counts can be generated by the ML model(s) for an airspace sector for a time period of interest (e.g., a past or historical time period). The second aircraft traffic counts can be representative of observed quantities of aircraft traffic counts associated with the airspace sector for the time period of interest. In such examples, the ML controller 420 can determine that the first ML model has a first difference based on a difference between (1) a first count generated by the first ML model and (2) a second count stored in the second database 208. The ML controller 420 can determine that the second ML model has a second difference based on a difference between (1) a third count generated by the second ML model and (2) the second count. In such examples, the ML controller 420 can determine that the first difference is less than the second difference.

At block 1408, the ART sector services 216 selects an ML model having the highest score and/or the lowest difference. For example, the ML controller 420 can identify and/or otherwise determine that the first ML model has the highest cross-validation score with respect to the plurality of the ML models and/or the first ML model has the lowest difference.

At block 1410, the ART sector services 216 obtains sector information including traffic counts from the pre-processed database. For example, the ML controller 420 can obtain traffic counts from the second database 208 (FIG. 2).

At block 1412, the ART sector services 216 determines training data for training the ML model having the highest score. For example, the ML controller 420 can identify sector information corresponding to one or more sectors as training data that can be used to train a regression model, a RNN, etc., that had the highest cross-validation score. An example process that may be used to implement block 1412 is described below in connection with FIG. 15.

At block 1414, the ART sector services 216 trains the ML model using the training data. For example, the ML controller 420 can train the first ML model, which had the highest cross-validation score, using training data from which outlier data has been removed.

At block 1416, the ART sector services 216 compiles a trained ML model as a computer-readable executable. For example, the ML controller 420 can compile the trained instance or version of the first ML model into a computer-readable executable. In such examples, the computer-readable executable can be a binary file, an executable, etc. The ML controller 420 can store the computer-readable executable as the ML model(s) 470 (FIG. 4) in the ART sector services database 460 (FIG. 4). In response to compiling the trained ML model as a computer-readable executable at block 1416, control returns to block 1108 of the machine readable instructions 1100 of FIG. 11 to execute the trained ML model(s) to generate traffic count for sector(s).

Figure 15:
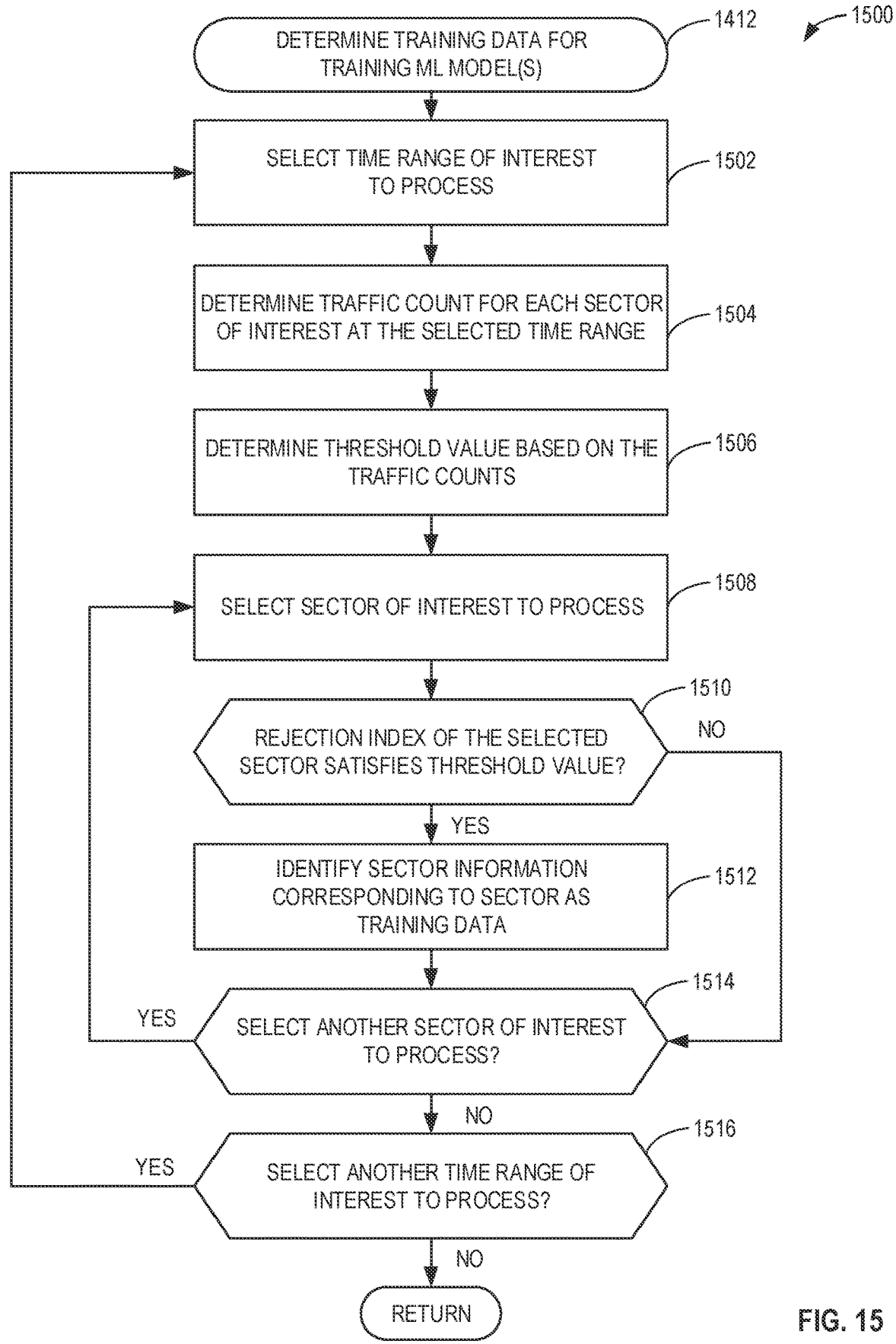
FIG. 15 is a flowchart representative of example machine readable instructions that may be executed to implement the ART sector services of FIGS. 2 and/or 4, and/or, more generally, the ART prediction system of FIGS. 1 and/or 2, to determine training data for training machine-learning model(s).

FIG. 15 is a flowchart representative of example machine readable instructions 1500 that may be executed to implement the ART sector services 216 of FIGS. 2 and/or 4, and/or, more generally, the ART prediction system 104 of FIGS. 1 and/or 2, to determine training data for training machine-learning model(s). The machine readable instructions 1500 of FIG. 15 can be executed to implement block 1412 of FIG. 14.

The machine readable instructions 1500 of FIG. 15 begin at block 1502, at which the ART sector services 216 selects a time range of interest to process. For example, the ML controller 420 (FIG. 4) can select a twentieth bucket to process.

At block 1504, the ART sector services 216 determines a traffic count for each sector of interest at the selected time range. For example, the ML controller 420 can determine the first through fourth sector counts 616, 618, 620, 622 of FIG. 6 at the twentieth bucket.

At block 1506, the ART sector services 216 determines a threshold value based on the traffic counts. For example, the ML controller 420 can determine the threshold value to be 0.5 by normalizing an average value of the first through fourth sector counts 616, 618, 620, 622 in a range of 0 to 1.0.

At block 1508, the ART sector services 216 selects a sector of interest to process. For example, the ML controller 420 can select a first sector corresponding to the first ART sector curve 602 of FIG. 6.

At block 1510, the ART sector services 216 determines whether a rejection index of the selected sector satisfies the threshold value. For example, the ML controller 420 can determine that the rejection index of the first sector corresponding to the first ART sector curve 602 is approximately 0.3. In such examples, the ML controller 420 can determine the rejection index of 0.3 based on normalizing an absolute value difference between the first sector count 616 of FIG. 6 and an average value of a plurality of sector counts including the first through fourth sector counts 616, 618, 620, 622 in a range of 0 to 1.0. The ML controller 420 can determine that the rejection index of 0.3 does not satisfy the threshold value of 0.5 by determining that the rejection index of 0.3 is less than the threshold value of 0.5.

If, at block 1510, the ART sector services 216 determines that the rejection index of the selected sector does not satisfy the threshold value, control proceeds to block 1514 to determine whether to select another sector of interest to process. If, at block 1510, the ART sector services 216 determines that the rejection index of the selected sector satisfies the threshold value, then, at block 1512, the ART sector services 216 identifies sector information corresponding to the sector as training data and control proceeds to block 1514. For example, the ML controller 420 can determine that the sector information associated with the first ART sector curve 602 of FIG. 6 can be included in training data to train one or more ML models.

At block 1514, the ART sector services 216 determines whether to select another sector of interest to process. For example, the ML controller 420 can determine to select a second sector corresponding to the second ART sector curve 604 of FIG. 6. In other examples, the ML controller 420 can determine that all sectors of interest have been processed and, thus, can determine that there is not another sector of interest to process.

If, at block 1514, the ART sector services 216 determines that there is another sector of interest to process, control returns to block 1508 to select another sector of interest to process. If, at block 1514, the ART sector services 216 determines that there is not another sector of interest to process, then, at block 1516, the ART sector services 216 determines whether to select another time range of interest to process. For example, the ML controller 420 can determine to select a twenty-first bucket, a thirtieth bucket, etc., to process. In other examples, the ML controller 420 can determine that all buckets of interest have been processed and, thus, can determine that there is not another bucket of interest to process.

If, at block 1516, the ART sector services 216 determines to select another time range of interest to process, control returns to block 1502 to select another time range of interest to process. If, at block 1516, the ART sector services 216 determines not to select another time range of interest to process, control returns to block 1412 of the machine readable instructions 1400 of FIG. 14 to train an ML model having the highest score using the training data.

Figure 16:
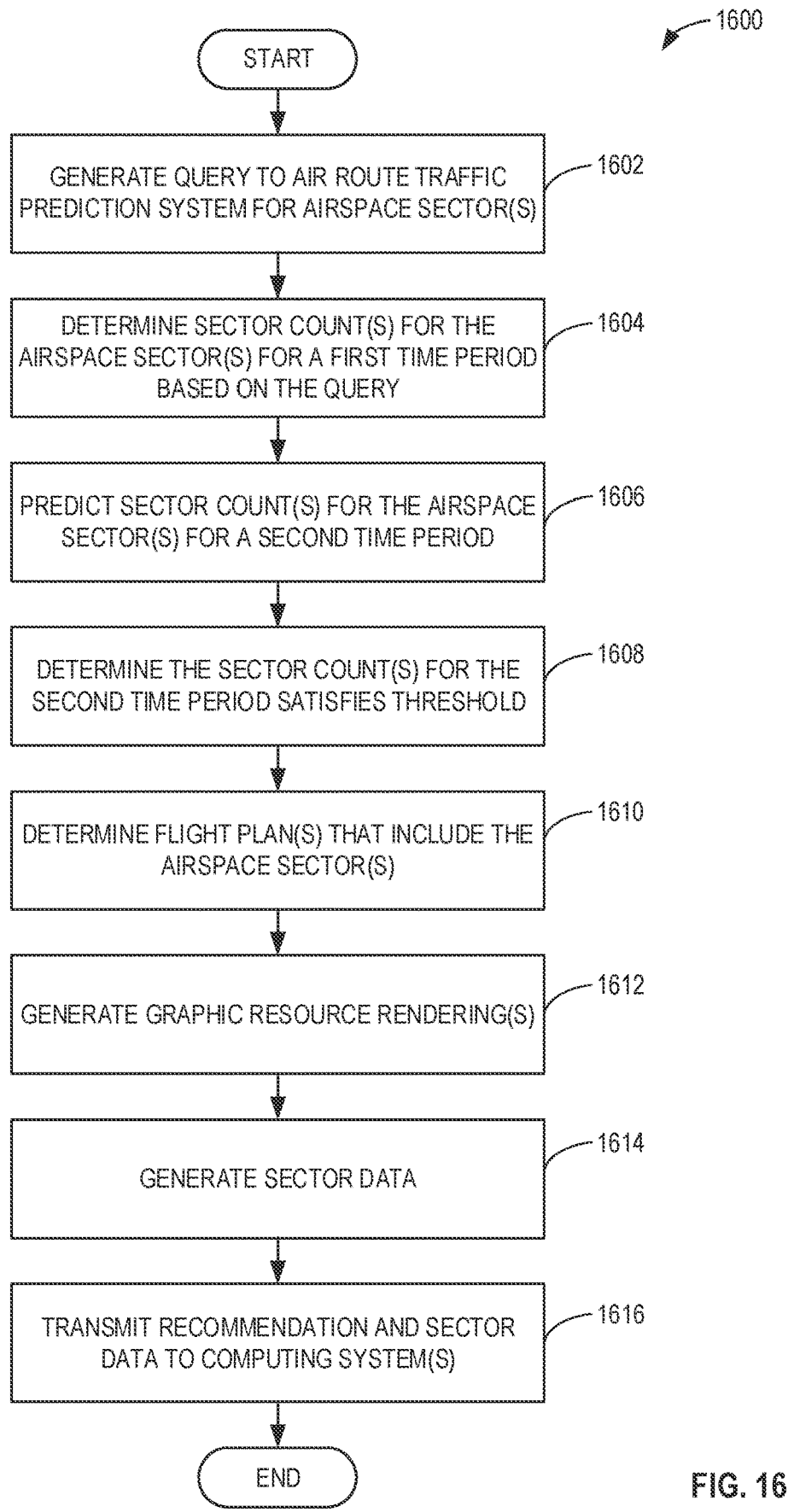
FIG. 16 is a flowchart representative of example machine readable instructions that may be executed to implement the ART prediction controller of FIG. 2, and/or, more generally, the ART prediction system of FIGS. 1 and/or 2, to determine traffic counts based on a query from a computing device or system.

FIG. 16 is a flowchart representative of example machine readable instructions 1600 that may be executed to implement the ART prediction controller 210 of FIG. 2, and/or, more generally, the ART prediction system 104 of FIGS. 1 and/or 2, to determine traffic counts based on a query from one or more of the second computing system(s) 114 of FIG. 1, one or more of the computing devices 226, 228, 230 of FIG. 2, etc., and/or a combination thereof.

The machine readable instructions 1600 of FIG. 16 begin at block 1602, at which the ART prediction controller 210 generates a query to the ART prediction system 104 for airspace sector(s). For example, the query controller 214 (FIG. 2) can generate a query based on a request obtained by the second network interface 212 (FIG. 2). In such examples, the second network interface 212 can obtain a request from the host application 224 (FIG. 2) executing on the third computing device 230 (FIG. 2) for traffic counts of the second sector 908 of FIG. 9 for a plurality of buckets, the plurality of buckets including a first bucket corresponding to a historical or already occurred bucket and a second bucket corresponding to a bucket that has not yet occurred. The query controller 214 can invoke the ART sector services 216 (FIG. 2) to determine the traffic counts.

At block 1604, the ART prediction controller 210 determines sector count(s) for the airspace sector(s) for a first time period based on the query. For example, the ART sector services 216 can determine a first sector count for the second sector 908 for the first bucket. In such examples, the traffic count determiner 430 (FIG. 4) can query the second database 208 for the first sector count.

At block 1606, the ART prediction controller 210 predicts sector count(s) for the airspace sector(s) for a second time period. For example, the ART sector services 216 can determine a second sector count for the second sector 908 for the second bucket. In such examples, the ML controller 420 (FIG. 4) can execute the ML model(s) 470 (FIG. 4) to predict and/or otherwise determine the second sector count for the second bucket.

At block 1608, the ART prediction controller 210 determines that the sector count(s) for the second time period satisfies a threshold. For example, the ART sector services 216 can determine that the quantity of aircraft predicted to be in the second sector 908 during the second bucket is greater than a threshold (e.g., a pre-defined threshold of aircraft that can be in a sector during a bucket, a government regulatory threshold of aircraft that can be in a sector during a bucket, etc.).

At block 1610, the ART prediction controller 210 determines flight plan(s) that include the airspace sector(s). For example, the ART sector services 216 can determine that the first flight plan 902 includes the second sector 908 during the second bucket. In such examples, the ART sector services 216 can generate a recommendation to the requesting computing system to adjust from the first flight plan 902 to the second flight plan 904, where the second flight plan 904 does not include the second sector 908 during the second bucket.

At block 1612, the ART prediction controller 210 generates graphic resource rendering(s). For example, the graphic resource renderer 220 (FIG. 2) can generate a graph, a plot, a table, etc., based on the first sector count, the first sector count parameter, the second sector count, and/or the second count parameter.

At block 1614, the ART prediction controller 210 generates sector data. For example, the ART sector services 216 can determine a first sector count parameter based on the first sector count. In such examples, the sector parameter determiner 450 (FIG. 4) can execute and/or otherwise invoke the service "getMeanPastDailySectorCountAllDays" of the source code 1000 of FIG. 10 to calculate a mean daily sector count for the first sector for one or more past continuous days. In other examples, the ART sector services 216 can determine a second sector count parameter based on the second sector count. In such examples, the sector parameter determiner 450 can execute and/or otherwise invoke a service to calculate a mean daily sector count for the second sector for one or more upcoming continuous days. The sector data generator 218 (FIG. 2) can package, encapsulate, and/or otherwise convert the sector counts, the sector count parameters, the graphic resource renderings, etc., into a data format that is readable by a requesting one of the computing devices 226, 228, 230.

At block 1616, the ART prediction controller 210 transmits a recommendation and the sector data to the computing system(s). For example, the second network interface 212 can transmit the (1) recommendation to adjust to the second flight plan 904 and (2) the sector data to the host application 224 of the third computing device 230 via the second network 116. In response to transmitting the recommendation and the sector data to the computing system(s) at block 1616, the machine readable instructions 1600 of FIG. 16 conclude.

Figure 17:
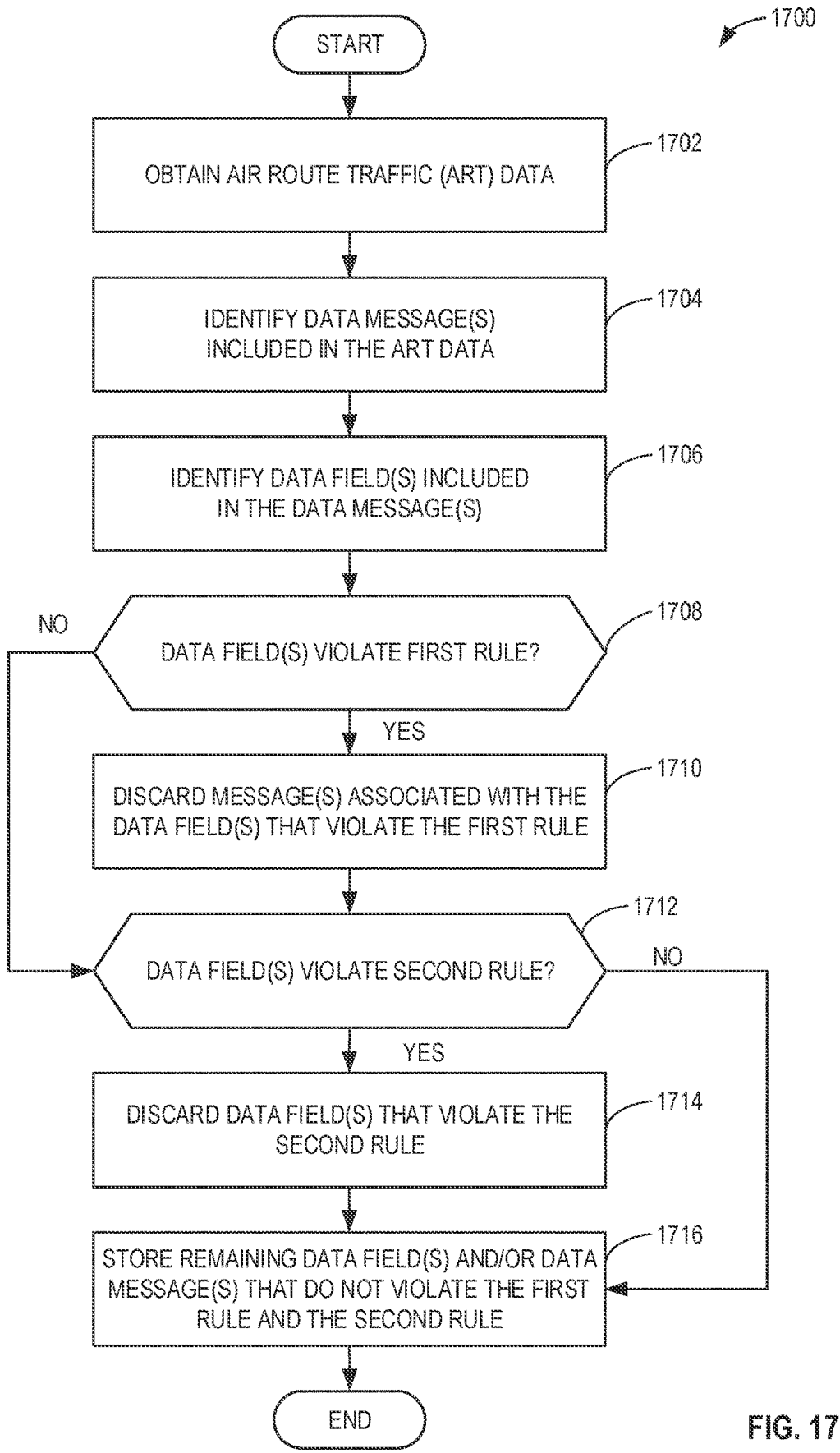
FIG. 17 is a flowchart representative of example machine readable instructions that may be executed to implement the ART prediction system of FIGS. 1 and/or 2, to process ART data.

FIG. 17 is a flowchart representative of example machine readable instructions 1700 that may be executed to implement the ART prediction system 104 of FIGS. 1 and/or 2 to process ART data. The machine readable instructions 1700 of FIG. 17 begin at block 1702, at which the ART prediction system 104 obtains ART data. For example, the network interface 202 (FIG. 2) can obtain the ART data 222 (FIG. 2) via the first network 110.

At block 1704, the ART prediction system 104 identifies data message(s) included in the ART data. For example, the database controller 204 (FIG. 2) can determine that the ART data 222 includes a first message and a second message of the message(s) 223 (FIG. 2).

At block 1706, the ART prediction system 104 identifies data field(s) included in the data message(s). For example, the database controller 204 can determine that the first message includes at least a first data field of the data field(s) 225 (FIG. 2) and the second message includes at least a second data field and a third data field of the data field(s) 225.

At block 1708, the ART prediction system 104 determines whether data field(s) violate a first rule. For example, the database controller 204 can determine that the first data field and/or, more generally, the first data message, violates a first rule representative of discarding a data message when a data field of the data message and/or, more generally, the data message, includes and/or is otherwise associated with weather data.

If, at block 1708, the ART prediction system 104 determines that the data field(s) do not violate the first rule, control proceeds to block 1712 to determine whether the data field(s) violate a second rule. If, at block 1708, the ART prediction system 104 determines that the data field(s) violate the first rule, then, at block 1710, the ART prediction system 104 discards message(s) associated with the data field(s) that violate the first rule and control proceeds to block 1712. For example, the database controller 204 can discard the first data message when the first data field violates the first rule.

At block 1712, the ART prediction system 104 determines whether data field(s) violate a second rule. For example, the database controller 204 can determine that the second data field violates a second rule representative of discarding a data field when the data field includes and/or is otherwise associated with a sector not of interest or a sector not to be analyzed.

If, at block 1712, the ART prediction system 104 determines that the data field(s) do not violate the second rule, control proceeds to block 1716 to store remaining data field(s) and/or data message(s) that do not violate the first rule and the second rule. If, at block 1712, the ART prediction system 104 determines that the data field(s) violate the second rule, then, at block 1714, the ART prediction system 104 discards data field(s) that violate the second rule. For example, the database controller 204 can discard the second data field when the second data field violates the second rule.

At block 1716, the ART prediction system 104 stores remaining data field(s) and/or data message(s) that do not violate the first rule and the second rule. For example, the database controller 204 can store the third data field when the third data field does not violate a plurality of rules including the first rule and the second rule. In response to storing the remaining data field(s) and/or data message(s) that do not violate the first rule and the second rule at block 1716, the machine readable instructions 1700 of FIG. 17 conclude.

Figure 18:
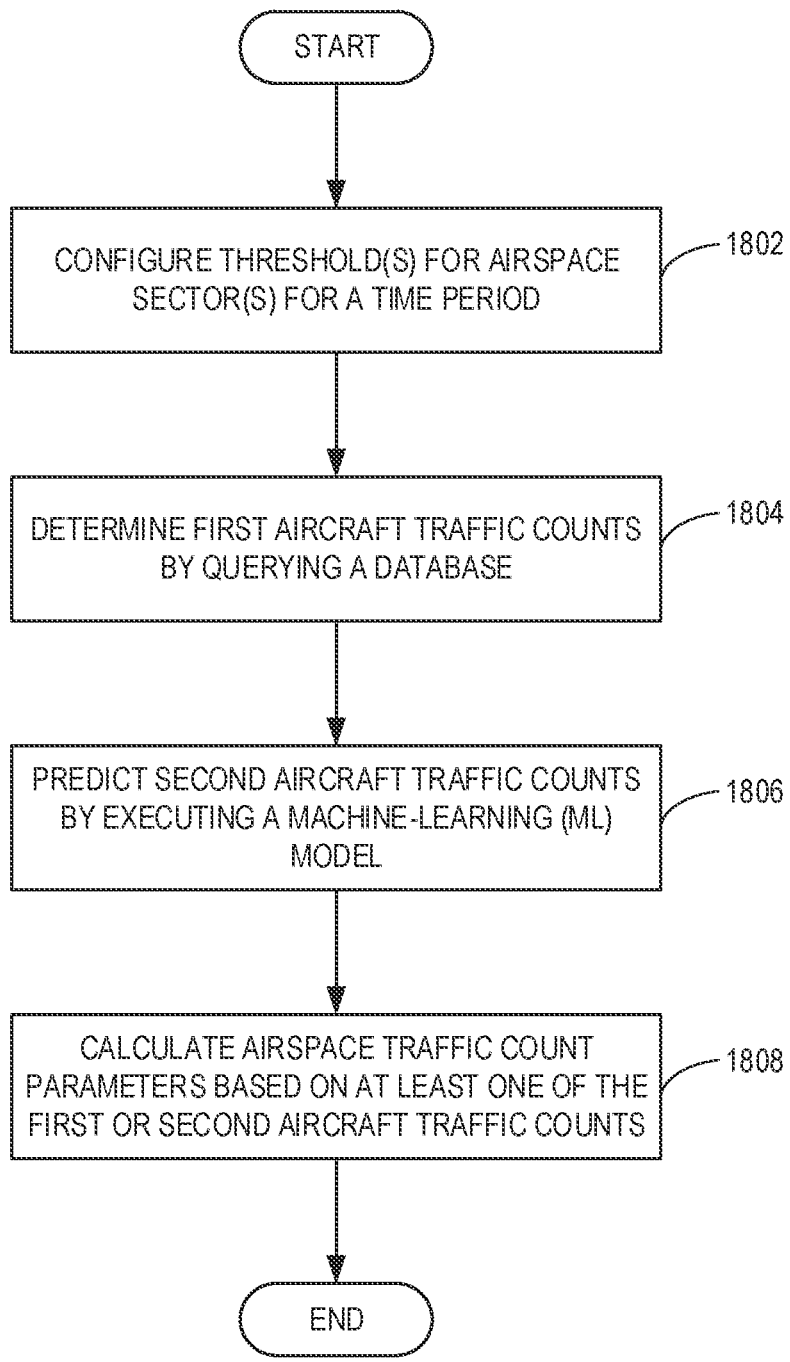
FIG. 18 is a flowchart representative of example machine readable instructions that may be executed to implement the ART prediction controller of FIG. 2, and/or, more generally, the ART prediction system of FIGS. 1 and/or 2, to calculate airspace traffic count parameters.

FIG. 18 is a flowchart representative of example machine readable instructions 1800 that may be executed to implement the ART prediction controller 210 of FIG. 2, and/or, more generally, the ART prediction system 104 of FIGS. 1 and/or 2, to calculate airspace traffic count parameters. The machine readable instructions 1800 of FIG. 18 begin at block 1802, at which the ART prediction controller 210 configures threshold(s) for airspace sector(s) for a time period. For example, the sector parameter determiner 450 (FIG. 4) can configure and/or otherwise determine a threshold that can be used by the sector data generator 218 of FIG. 2. The sector parameter determiner 450 can determine the threshold value for respective ones of sectors of interest for a future time period based on at least one of (1) first flight plans for the plurality of the aircraft 106A-F during the future time period, (2) weather information associated with the sectors of interest during the future time period, or (3) historical information including at least one of second flight plans or second weather information associated with the sectors during a previous time period, a historical time period, a time period before the future time period, etc.

At block 1804, the ART prediction controller 210 determines first aircraft traffic counts by querying a database. For example, the traffic count determiner 430 (FIG. 4) can determine the first traffic counts for the first sector 906, the second sector 908, etc., of FIG. 9 by querying the second database 208 (FIG. 2). In such examples, the first traffic counts can be observed traffic counts or previously determined traffic counts for the first sector 906, the second sector 908, etc.

At block 1806, the ART prediction controller 210 predicts second aircraft traffic counts by executing a machine-learning (ML) model. For example, the ML controller 420 can execute one or more of the ML model(s) 470 (FIG. 4) to predict second aircraft traffic counts for the first sector 906, the second sector 908, etc., for a future time period.

At block 1808, the ART prediction controller 210 calculates airspace traffic count parameters based on at least one of the first or second aircraft traffic counts. For example, the sector parameter determiner 450 can calculate and/or otherwise determine one or more airspace traffic count parameters based on at least one of the first aircraft traffic counts or the second aircraft traffic counts. In such examples, the sector parameter determiner 450 can execute one or more of the services depicted in the source code 1000 of FIG. 10 to calculate the one or more airspace traffic count parameters. In response to calculating the airspace traffic count parameters at block 1808, the machine readable instructions 1800 of FIG. 18 conclude.

Figure 19:
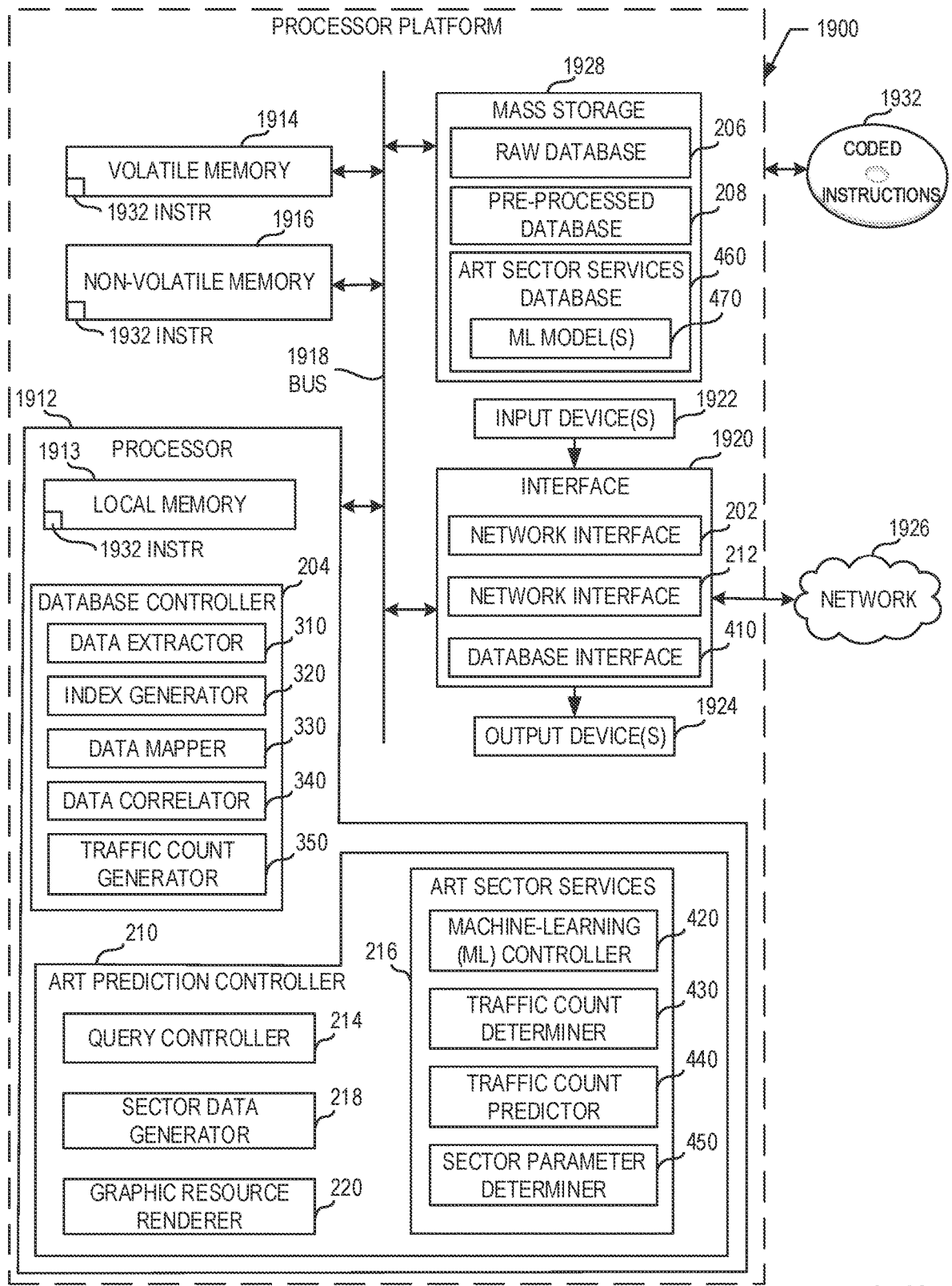
FIG. 19 is a block diagram of an example processing platform structured to execute the example machine readable instructions of FIGS. 10-18 to implement the ART prediction system of FIGS. 1 and/or 2.

FIG. 19 is a block diagram of an example processor platform 1900 structured to execute the instructions of FIGS. 10-18 to implement the ART prediction system 104 of FIGS. 1 and/or 2. The processor platform 1900 can be, for example, a server, a personal computer, a workstation, a self-learning machine (e.g., a neural network), or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1912 implements the example data extractor 310, the example index generator 320, the example data mapper 330, the example data correlator 340, and the example traffic count generator 350 of FIG. 3, and/or, more generally, the example database controller 204 of FIGS. 2 and/or 3. In this example, the processor 1912 implements the example ML controller 420, the example traffic count determiner 430, the example traffic count predictor 440, and the example sector parameter determiner 450 of FIG. 4, and/or, more generally, the example ART sector services 216 of FIGS. 2 and/or 4. In this example, the processor 1912 implements the example query controller 214, the example ART sector services 216, the example sector data generator 218, and the example graphic resource renderer 220 of FIG. 2, and/or, more generally, the ART prediction controller 210 of FIG. 2.

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by SDRAM, DRAM, RDRAM, and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), a Bluetooth® interface, a near field communication (NFC) interface, and/or a PCI express interface. In this example, the interface circuit 1920 implements the first example network interface 202 of FIG. 2, the second example network interface 212 of FIG. 2, and the example database interface 410 of FIG. 4.

In the illustrated example, one or more input devices 1922 are connected to the interface circuit 1920. The input device(s) 1922 permit(s) a user to enter data and/or commands into the processor 1912. The input device(s) 1922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1920 of the illustrated example, thus, typically includes a graphics driver card, a graphics driver chip and/or a graphics driver processor.

The interface circuit 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, redundant array of independent disks (RAID) systems, and digital versatile disk (DVD) drives. In this example, the one or more mass storage devices 1928 implement the first example database 206 of FIG. 2, the second example database 208 of FIG. 2, and the example ART sector services database 460 of FIG. 4, which includes the example ML model(s) 470 of FIG. 4.

The machine executable instructions (INSTR) 1932 of FIGS. 10-18 may be stored in the mass storage device 1928, in the volatile memory 1914, in the non-volatile memory 1916, and/or on a removable non-transitory computer readable storage medium such as a CD or DVD.

From the foregoing, it will be appreciated that example systems, methods, apparatus, and articles of manufacture have been disclosed that improve aircraft traffic control. The above-disclosed examples are representative of a data management and analytics system that can accurately predict and/or otherwise determine aircraft traffic counts for an airspace sector within the NAS or other air traffic management environment. The above-disclosed examples illustrate an ART prediction system that can be used as a ground-based decision support tool by airlines and ANSPs or an air-based decision support tool by flight crew. The ART prediction system can predict and/or otherwise determine aircraft traffic counts for air traffic sectors of interest to enable airlines to adjust flight plans or reroute aircraft to airspace with less dense traffic or congestion. Such adjustments can translate to an improved efficiency of the NAS or other air traffic management environment, which can result in a higher degree of automation and thereby reduce workloads currently managed by air traffic controllers.

The ART prediction system can continuously consume and learn from millions of FIXM messages on average per day provided by the TFM Data Service. The ART prediction system can clean, correlate, index, and store the FIRM messages to be used by a set of microservices deployed on a cloud computing platform. Advantageously, by deploying the set of microservices on the cloud computing platform, the ART prediction system can be distributed, scalable, and highly available. The disclosed systems, methods, apparatus, and articles of manufacture improve the efficiency of using a computing device by executing an ML model on sanitized and correlated ART data, which enables the ART prediction system to evaluate a plurality of different types of ML models to identify which of the ML models can determine high-accuracy values. The disclosed methods, apparatus and articles of manufacture are accordingly directed to one or more improvement(s) in the functioning of a computer.

Example methods, apparatus, systems, and articles of manufacture to improve aircraft traffic control are disclosed herein. Further examples and combinations thereof include the following:

Example 1 includes an apparatus comprising a network interface to obtain air route traffic data associated with a plurality of aircraft flying in airspace sectors, the air route traffic data associated with a first time period, a database controller to generate a first database entry by mapping one or more extracted portions of the air route traffic data to a first database entry field included in the first database entry, the first database entry field associated with a respective one of the plurality of the aircraft, and air route traffic (ART) sector services to execute a plurality of machine learning models using database entries to generate first aircraft traffic counts of the airspace sectors during the first time period, the database entries including the first database entry, in response to selecting a first machine learning model of the plurality of the machine learning models based on the first aircraft traffic counts, execute the first machine learning model to generate second aircraft traffic counts of the airspace sectors during a second time period after the first time period, and transmit the second aircraft traffic counts to a computing device to cause an adjustment of a flight plan of a first aircraft of the plurality of the aircraft.

Example 2 includes the apparatus of example 1, wherein the air route traffic data includes data messages having one or more data fields, the data messages including a first data message having a first data field and a second data message having a second data field and a third data field, and the database controller is to discard the first data message when the first data field violates a rule, discard the second data field when the second data field violates the rule, and store the third data field when the third data field does not violate a plurality of rules including the rule.

Example 3 includes the apparatus of example 1, wherein the air route traffic data includes a first data message having a first data field, and the database controller is to identify a second aircraft of the plurality of the aircraft based on the first data field, the first data field including a flight number of the second aircraft, generate the first database entry field by storing the flight number in the first database entry field, generate the first database entry by storing the first database entry field in the first database entry, and in response to identifying the flight number in one or more second data messages included in the air route traffic data, store one or more second data fields of the one or more second data messages in the first database entry.

Example 4 includes the apparatus of example 1, wherein the ART sector services are to determine differences between the first aircraft traffic counts and third aircraft traffic counts, the third aircraft traffic counts representative of observed quantities of aircraft traffic counts associated with the airspace sectors during the first time period, the first machine learning model having a first difference of the differences, and in response to the first difference being less than the remaining differences, select the first machine learning model for execution.

Example 5 includes the apparatus of example 1, wherein the second aircraft traffic counts include a third aircraft traffic count of a first airspace sector of the airspace sectors, the flight plan is a first flight plan, and the ART sector services are to determine that the third aircraft traffic count satisfies a threshold representative of a quantity of aircraft to fly in the first airspace sector during the second time period, determine that the first flight plan includes the first airspace sector during the second time period, and transmit a recommendation to the first aircraft to adjust from the first flight plan to a second flight plan, the second flight plan not including the first airspace sector during the second time period.

Example 6 includes the apparatus of example 1, wherein the ART sector services includes at least one microservice to configure a threshold for respective ones of the airspace sectors for the second time period based on at least one of first flight plans for the plurality of the aircraft during the second time period, first weather information associated with the airspace sectors during the second time period, or historical information including at least one of second flight plans or second weather information associated with the airspace sectors during the first time period, determine the first aircraft traffic counts by querying a database, predict the second aircraft traffic counts by executing the first machine learning model, and calculate one or more airspace traffic count parameters based on at least one of the first aircraft traffic counts or the second aircraft traffic counts.

Example 7 includes the apparatus of example 6, wherein the at least one microservice is executed using at least one of virtual compute resources, virtual network resources, or virtual storage resources of a cloud computing platform.

Example 8 includes a non-transitory computer readable storage medium comprising instructions that, when executed, cause at least one machine to at least obtain air route traffic data associated with a plurality of aircraft flying in airspace sectors, the air route traffic data associated with a first time period, generate a first database entry having a first database entry field associated with a respective one of the plurality of the aircraft by mapping one or more extracted portions of the air route traffic data to the first database entry field, execute a plurality of machine learning models using database entries to generate first aircraft traffic counts of the airspace sectors during the first time period, the database entries including the first database entry, in response to selecting a first machine learning model of the plurality of the machine learning models based on the first aircraft traffic counts, execute the first machine learning model to generate second aircraft traffic counts of the airspace sectors during a second time period after the first time period, and transmit the second aircraft traffic counts to a computing device to cause an adjustment of a flight plan of a first aircraft of the plurality of the aircraft.

Example 9 includes the non-transitory computer readable storage medium of example 8, wherein the air route traffic data includes data messages having one or more data fields, the data messages including a first data message having a first data field and a second data message having a second data field and a third data field, and the instructions, when executed, cause the at least one machine to discard the first data message when the first data field violates a rule, discard the second data field when the second data field violates the rule, and store the third data field when the third data field does not violate a plurality of rules including the rule.

Example 10 includes the non-transitory computer readable storage medium of example 8, wherein the air route traffic data includes a first data message having a first data field, and the instructions, when executed, cause the at least one machine to identify a second aircraft of the plurality of the aircraft based on the first data field, generate the first database entry field based on the first data field, generate the first database entry including the first database entry field, and store one or more second data fields of one or more second data messages in the first database entry in response to identifying the first data field in the one or more second data messages, the second data messages included in the air route traffic data.

Example 11 includes the non-transitory computer readable storage medium of example 8, wherein the instructions, when executed, cause the at least one machine to determine differences between the first aircraft traffic counts and third aircraft traffic counts, the third aircraft traffic counts representative of observed quantities of aircraft traffic counts associated with the airspace sectors during the first time period, the first machine learning model having a first difference of the differences, and in response to the first difference being less than the remaining differences, select the first machine learning model for execution.

Example 12 includes the non-transitory computer readable storage medium of example 8, wherein the second aircraft traffic counts include a third aircraft traffic count of a first airspace sector of the airspace sectors, the flight plan is a first flight plan, and the instructions, when executed, cause the at least one machine to determine that the third aircraft traffic count satisfies a threshold representative of a quantity of aircraft to fly in the first airspace sector during the second time period, determine that the first flight plan includes the first airspace sector during the second time period, and transmit a recommendation to the first aircraft to adjust from the first flight plan to a second flight plan, the second flight plan not including the first airspace sector during the second time period.

Example 13 includes the non-transitory computer readable storage medium of example 8, wherein the instructions, when executed, cause the at least one machine to configure, by executing an instruction with at least one microservice, a threshold for respective ones of the airspace sectors for the second time period based on at least one of first flight plans for the plurality of the aircraft during the second time period, first weather information associated with the airspace sectors during the second time period, or historical information including at least one of second flight plans or second weather information associated with the airspace sectors during the first time period, determine, by executing an instruction with the at least one microservice, the first aircraft traffic counts by querying a database, predict, by executing an instruction with the at least one microservice, the second aircraft traffic counts by executing the first machine learning model, and calculate, by executing an instruction with the at least one microservice, one or more airspace traffic count parameters based on at least one of the first aircraft traffic counts or the second aircraft traffic counts.

Example 14 includes the non-transitory computer readable storage medium of example 13, wherein at least one of (1) the at least one machine or (2) the at least one microservice correspond to virtual hardware resources.

Example 15 includes a method comprising obtaining air route traffic data associated with a plurality of aircraft flying in airspace sectors, the air route traffic data associated with a first time period, generating a first database entry by mapping one or more extracted portions of the air route traffic data to a first database entry field included in the first database entry, the first database entry field associated with a respective one of the plurality of the aircraft, executing a plurality of machine learning models using database entries to generate first aircraft traffic counts of the airspace sectors during the first time period, the database entries including the first database entry, in response to selecting a first machine learning model of the plurality of the machine learning models based on the first aircraft traffic counts, executing the first machine learning model to generate second aircraft traffic counts of the airspace sectors during a second time period after the first time period, and transmitting the second aircraft traffic counts to a computing device to cause an adjustment of a flight plan of a first aircraft of the plurality of the aircraft.

Example 16 includes the method of example 15, wherein the air route traffic data includes data messages having one or more data fields, the data messages including a first data message having a first data field and a second data message having a second data field and a third data field, and further including discarding the first data message when the first data field violates a rule, discarding the second data field when the second data field violates the rule, and storing the third data field when the third data field does not violate a plurality of rules including the rule.

Example 17 includes the method of example 15, wherein the air route traffic data includes a first data message having a first data field, and further including identifying a second aircraft of the plurality of the aircraft based on the first data field, the first data field including a flight number of the second aircraft, generating the first database entry field by storing the flight number in the first database entry field, generating the first database entry by storing the first database entry field in the first database entry, and in response to identifying the flight number in one or more second data messages included in the air route traffic data, storing one or more second data fields of the one or more second data messages in the first database entry.

Example 18 includes the method of example 15, further including determining differences between the first aircraft traffic counts and third aircraft traffic counts, the third aircraft traffic counts representative of observed quantities of aircraft traffic counts associated with the airspace sectors during the first time period, the first machine learning model having a first difference of the differences, and in response to the first difference being less than the remaining differences, selecting the first machine learning model for execution.

Example 19 includes the method of example 15, wherein the second aircraft traffic counts include a third aircraft traffic count of a first airspace sector of the airspace sectors, the flight plan is a first flight plan, and further including determining that the third aircraft traffic count satisfies a threshold representative of a quantity of aircraft to fly in the first airspace sector during the second time period, determining that the first flight plan includes the first airspace sector during the second time period, and transmitting a recommendation to the first aircraft to adjust from the first flight plan to a second flight plan, the second flight plan not including the first airspace sector during the second time period.

Example 20 includes the method of example 15, further including configuring, by executing an instruction with at least one microservice, a threshold for respective ones of the airspace sectors for the second time period based on at least one of first flight plans for the plurality of the aircraft during the second time period, first weather information associated with the airspace sectors during the second time period, or historical information including at least one of second flight plans or second weather information associated with the airspace sectors during the first time period, determining, by executing an instruction with the at least one microservice, the first aircraft traffic counts by querying a database, predicting, by executing an instruction with the at least one microservice, the second aircraft traffic counts by executing the first machine learning model, and calculating, by executing an instruction with the at least one microservice, one or more airspace traffic count parameters based on at least one of the first aircraft traffic counts or the second aircraft traffic counts.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   a network interface to obtain air route traffic data associated with a plurality of aircraft flying in airspace sectors, the air route traffic data associated with a first time period;
   a database controller to generate a first database entry by mapping one or more extracted portions of the air route traffic data to a first database entry field included in the first database entry, the first database entry field associated with a respective one of the plurality of the aircraft; and
   air route traffic (ART) sector services to:
      execute a plurality of machine learning models using database entries to generate first aircraft traffic counts of the airspace sectors during the first time period, the database entries including the first database entry;
      after a selection of a first machine learning model of the plurality of the machine learning models based on comparisons of the first aircraft traffic counts from the plurality of the machine learning models, execute the first machine learning model to generate second aircraft traffic counts of the airspace sectors during a second time period after the first time period; and
      transmit the second aircraft traffic counts to a computing device to cause an adjustment of a flight plan of a first aircraft of the plurality of the aircraft.

2. The apparatus of claim 1, wherein the air route traffic data includes data messages having one or more data fields, the data messages including a first data message having a first data field and a second data message having a second data field and a third data field, and the database controller is to:
   discard the first data message when the first data field violates a rule;
   discard the second data field when the second data field violates the rule; and
   store the third data field when the third data field does not violate a plurality of rules including the rule.

3. The apparatus of claim 1, wherein the air route traffic data includes a first data message having a first data field, and the database controller is to:
   identify a second aircraft of the plurality of the aircraft based on the first data field, the first data field including a flight number of the second aircraft;
   generate the first database entry field by storing the flight number in the first database entry field;
   generate the first database entry by storing the first database entry field in the first database entry; and
   in response to identifying the flight number in one or more second data messages included in the air route traffic data, store one or more second data fields of the one or more second data messages in the first database entry.

4. The apparatus of claim 1, wherein the ART sector services are to:
   determine differences between the first aircraft traffic counts and third aircraft traffic counts, the third aircraft traffic counts representative of observed quantities of aircraft traffic counts associated with the airspace sectors during the first time period, the first machine learning model having a first difference of the differences; and in response to the first difference being less than the remaining differences, select the first machine learning model for execution.

5. The apparatus of claim 1, wherein the second aircraft traffic counts include a third aircraft traffic count of a first airspace sector of the airspace sectors, the flight plan is a first flight plan, and the ART sector services are to:

determine that the third aircraft traffic count satisfies a threshold representative of a quantity of aircraft to fly in the first airspace sector during the second time period;

determine that the first flight plan includes the first airspace sector during the second time period; and transmit a recommendation to the first aircraft to adjust from the first flight plan to a second flight plan, the second flight plan not including the first airspace sector during the second time period.

6. The apparatus of claim 1, wherein the ART sector services includes at least one microservice to:

configure a threshold for respective ones of the airspace sectors for the second time period based on at least one of first flight plans for the plurality of the aircraft during the second time period, first weather information associated with the airspace sectors during the second time period, or historical information including at least one of second flight plans or second weather information associated with the airspace sectors during the first time period;

determine the first aircraft traffic counts by querying a database;

predict the second aircraft traffic counts by executing the first machine learning model; and calculate one or more airspace traffic count parameters based on at least one of the first aircraft traffic counts or the second aircraft traffic counts.

7. The apparatus of claim 6, wherein the at least one microservice is executed using at least one of virtual compute resources, virtual network resources, or virtual storage resources of a cloud computing platform.

8. A non-transitory computer readable storage medium comprising instructions that, when executed, cause at least one machine to at least:

obtain air route traffic data associated with a plurality of aircraft flying in airspace sectors, the air route traffic data associated with a first time period;

generate a first database entry having a first database entry field associated with a respective one of the plurality of the aircraft by mapping one or more extracted portions of the air route traffic data to the first database entry field;

execute a plurality of machine learning models using database entries to generate first aircraft traffic counts of the airspace sectors during the first time period, the database entries including the first database entry;

after a selection of a first machine learning model of the plurality of the machine learning models based on comparisons of the first aircraft traffic counts from the plurality of the machine learning models, execute the first machine learning model to generate second aircraft traffic counts of the airspace sectors during a second time period after the first time period; and transmit the second aircraft traffic counts to a computing device to cause an adjustment of a flight plan of a first aircraft of the plurality of the aircraft.

9. The non-transitory computer readable storage medium of claim 8, wherein the air route traffic data includes data messages having one or more data fields, the data messages including a first data message having a first data field and a second data message having a second data field and a third data field, and the instructions, when executed, cause the at least one machine to:

discard the first data message when the first data field violates a rule;

discard the second data field when the second data field violates the rule; and store the third data field when the third data field does not violate a plurality of rules including the rule.

10. The non-transitory computer readable storage medium of claim 8, wherein the air route traffic data includes a first data message having a first data field, and the instructions, when executed, cause the at least one machine to:

identify a second aircraft of the plurality of the aircraft based on the first data field;

generate the first database entry field based on the first data field;

generate the first database entry including the first database entry field; and store one or more second data fields of one or more second data messages in the first database entry in response to identifying the first data field in the one or more second data messages, the second data messages included in the air route traffic data.

11. The non-transitory computer readable storage medium of claim 8, wherein the instructions, when executed, cause the at least one machine to:

determine differences between the first aircraft traffic counts and third aircraft traffic counts, the third aircraft traffic counts representative of observed quantities of aircraft traffic counts associated with the airspace sectors during the first time period, the first machine learning model having a first difference of the differences; and in response to the first difference being less than the remaining differences, select the first machine learning model for execution.

12. The non-transitory computer readable storage medium of claim 8, wherein the second aircraft traffic counts include a third aircraft traffic count of a first airspace sector of the airspace sectors, the flight plan is a first flight plan, and the instructions, when executed, cause the at least one machine to:

determine that the third aircraft traffic count satisfies a threshold representative of a quantity of aircraft to fly in the first airspace sector during the second time period;

determine that the first flight plan includes the first airspace sector during the second time period; and transmit a recommendation to the first aircraft to adjust from the first flight plan to a second flight plan, the second flight plan not including the first airspace sector during the second time period.

13. The non-transitory computer readable storage medium of claim 8, wherein the instructions, when executed, cause the at least one machine to:

configure, by executing an instruction with at least one microservice, a threshold for respective ones of the airspace sectors for the second time period based on at least one of first flight plans for the plurality of the aircraft during the second time period, first weather information associated with the airspace sectors during the second time period, or historical information including at least one of second flight plans or second weather information associated with the airspace sectors during the first time period;
determine, by executing an instruction with the at least one microservice, the first aircraft traffic counts by querying a database;
predict, by executing an instruction with the at least one microservice, the second aircraft traffic counts by executing the first machine learning model; and
calculate, by executing an instruction with the at least one microservice, one or more airspace traffic count parameters based on at least one of the first aircraft traffic counts or the second aircraft traffic counts.

14. The non-transitory computer readable storage medium of claim 13, wherein at least one of (1) the at least one machine or (2) the at least one microservice correspond to virtual hardware resources.

15. A method comprising:
obtaining air route traffic data associated with a plurality of aircraft flying in airspace sectors, the air route traffic data associated with a first time period;
generating a first database entry by mapping one or more extracted portions of the air route traffic data to a first database entry field included in the first database entry, the first database entry field associated with a respective one of the plurality of the aircraft;
executing a plurality of machine learning models using database entries to generate first aircraft traffic counts of the airspace sectors during the first time period, the database entries including the first database entry;
after selecting a first machine learning model of the plurality of the machine learning models based on comparisons of the first aircraft traffic counts from the plurality of the machine learning models, executing the first machine learning model to generate second aircraft traffic counts of the airspace sectors during a second time period after the first time period; and
transmitting the second aircraft traffic counts to a computing device to cause an adjustment of a flight plan of a first aircraft of the plurality of the aircraft.

16. The method of claim 15, wherein the air route traffic data includes data messages having one or more data fields, the data messages including a first data message having a first data field and a second data message having a second data field and a third data field, and further including:
discarding the first data message when the first data field violates a rule;
discarding the second data field when the second data field violates the rule; and
storing the third data field when the third data field does not violate a plurality of rules including the rule.

17. The method of claim 15, wherein the air route traffic data includes a first data message having a first data field, and further including:
identifying a second aircraft of the plurality of the aircraft based on the first data field, the first data field including a flight number of the second aircraft;

generating the first database entry field by storing the flight number in the first database entry field;
generating the first database entry by storing the first database entry field in the first database entry; and
in response to identifying the flight number in one or more second data messages included in the air route traffic data, storing one or more second data fields of the one or more second data messages in the first database entry.

18. The method of claim 15, further including:
determining differences between the first aircraft traffic counts and third aircraft traffic counts, the third aircraft traffic counts representative of observed quantities of aircraft traffic counts associated with the airspace sectors during the first time period, the first machine learning model having a first difference of the differences; and
in response to the first difference being less than the remaining differences, selecting the first machine learning model for execution.

19. The method of claim 15, wherein the second aircraft traffic counts include a third aircraft traffic count of a first airspace sector of the airspace sectors, the flight plan is a first flight plan, and further including:
determining that the third aircraft traffic count satisfies a threshold representative of a quantity of aircraft to fly in the first airspace sector during the second time period;
determining that the first flight plan includes the first airspace sector during the second time period; and
transmitting a recommendation to the first aircraft to adjust from the first flight plan to a second flight plan, the second flight plan not including the first airspace sector during the second time period.

20. The method of claim 15, further including:
configuring, by executing an instruction with at least one microservice, a threshold for respective ones of the airspace sectors for the second time period based on at least one of first flight plans for the plurality of the aircraft during the second time period, first weather information associated with the airspace sectors during the second time period, or historical information including at least one of second flight plans or second weather information associated with the airspace sectors during the first time period;
determining, by executing an instruction with the at least one microservice, the first aircraft traffic counts by querying a database;
predicting, by executing an instruction with the at least one microservice, the second aircraft traffic counts by executing the first machine learning model; and
calculating, by executing an instruction with the at least one microservice, one or more airspace traffic count parameters based on at least one of the first aircraft traffic counts or the second aircraft traffic counts.

* * * * *